(12) United States Patent
Gentry et al.

(10) Patent No.: US 8,615,606 B2
(45) Date of Patent: Dec. 24, 2013

(54) METHODS AND APPARATUS TO MANIPULATE SERVICES IN A DISTRIBUTED BUSINESS INTELLIGENCE COMPUTING ENVIRONMENT

(75) Inventors: Adam Gentry, Livermore, CA (US); Seema Manoj Gautam, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 549 days.

(21) Appl. No.: 12/332,189

(22) Filed: Dec. 10, 2008

(65) Prior Publication Data
US 2010/0146041 A1 Jun. 10, 2010

(51) Int. Cl.
G06F 15/16 (2006.01)
(52) U.S. Cl.
USPC .......................... 709/246; 709/201; 709/223
(58) Field of Classification Search
USPC ................. 709/246, 201, 203, 208, 217, 219
See application file for complete search history.

(56) References Cited

U.S. PATENT DOCUMENTS

| | | | |
|---|---|---|---|
| 4,833,607 A | 5/1989 | Dethloff et al. | |
| 5,951,469 A | 9/1999 | Yamaura | |
| 6,263,388 B1 | 7/2001 | Cromer et al. | |
| 6,286,045 B1 | 9/2001 | Griffiths et al. | |
| 6,381,636 B1 | 4/2002 | Cromer et al. | |
| 6,415,324 B1 | 7/2002 | Cromer et al. | |
| 6,671,736 B2 | 12/2003 | Virine et al. | |
| 6,742,027 B1 | 5/2004 | Cromer et al. | |
| 7,475,127 B2 * | 1/2009 | Colrain et al. | 709/223 |
| 7,593,519 B2 * | 9/2009 | Qiang | 379/201.01 |
| 2002/0111959 A1 | 8/2002 | Ching et al. | |
| 2005/0207105 A1 | 9/2005 | Davies | |
| 2006/0274678 A1 | 12/2006 | Holloway et al. | |
| 2007/0214208 A1 | 9/2007 | Balachandran et al. | |
| 2009/0158292 A1 * | 6/2009 | Rattner et al. | 718/106 |
| 2009/0177727 A1 * | 7/2009 | Radia et al. | 709/201 |
| 2009/0204696 A1 * | 8/2009 | Zhang et al. | 709/223 |

OTHER PUBLICATIONS

BusinessObjects Enterprise™ XI Getting Started Guide, BusinessObjects, Copyright 2004, 88 pages.
BusinessObjects Enterprise™ XI Release 2 Administrator's Guide, BusinessObjects, Copyright 2006, 328 pages.
BusinessObjects Enterprise™ XI Release 2 Administrator's Reference Guide, BusinessObjects, Copyright 2005, 128 pages.
BusinessObjects Enterprise™ XI Release 2 Deployment and Configuration Guide, BusinessObjects, Copyright 2007, 508 pages.
BusinessObjects Enterprise, BusinessObjects, Copyright 2008, 4 pages.
What's New in BusinessObjects XI—All Releases, BusinessObjects, Copyright 2008, 16 pages.
BusinessObjects Enterprise XI; Includes Updates for BusinessObjects XI Productivity Pack, BusinessObjects, Copyright 2008, 28 pages.

* cited by examiner

*Primary Examiner* — Barbara Burgess
(74) *Attorney, Agent, or Firm* — Hanley, Flight & Zimmerman, LLC

(57) ABSTRACT

Methods and apparatus to manipulate services in a distributed business intelligence computing environment are disclosed. An example method for service manipulation in a distributed computing environment disclosed herein comprises specifying at a first computing device a dependency relationship between a first service and a second service implementing at least portions of the distributed computing environment, at least one of the first service and the second service operating on a second computing device different from the first computing device, and conditioning invocation of a specified operation to manipulate an operational state of the first service, the invocation of the specified operation being conditioned on the specified dependency relationship between the first service and the second service.

22 Claims, 26 Drawing Sheets

METHODS AND APPARATUS TO MANIPULATE SERVICES IN A DISTRIBUTED BUSINESS INTELLIGENCE COMPUTING ENVIRONMENT

FIELD OF THE DISCLOSURE

This disclosure relates generally to distributed computing environments and, more particularly, to methods and apparatus to manipulate services in a distributed business intelligence computing environment.

BACKGROUND

Many modern business intelligence applications employ a distributed computing environment designed to, for example, improve business productivity and decision making activities by supporting the collection, integration, analysis, and presentation of business-related data. For example, the BusinessObjects™ Enterprise business intelligence platform includes a variety of servers, implemented as services in a Microsoft Windows™ environment, to perform data collection, integration, analysis, and presentation. Additionally, utilities such as a Central Configuration Manager (CCM) and a Central Management Console (CMC) are provided to support BusinessObjects™ server manipulation, such as server stopping and starting and/or disabling and enabling. For example, a first server may need to be stopped to allow the server to be renamed, relocated, reconfigured, etc., with the first server being restarted thereafter. Additionally, in such an example, a second server may need to be disabled to prevent it from receiving and responding to service requests while manipulation of the first server is taking place, with the second server to be enabled after the first server has been restarted.

DETAILED DESCRIPTION

Figure 1:
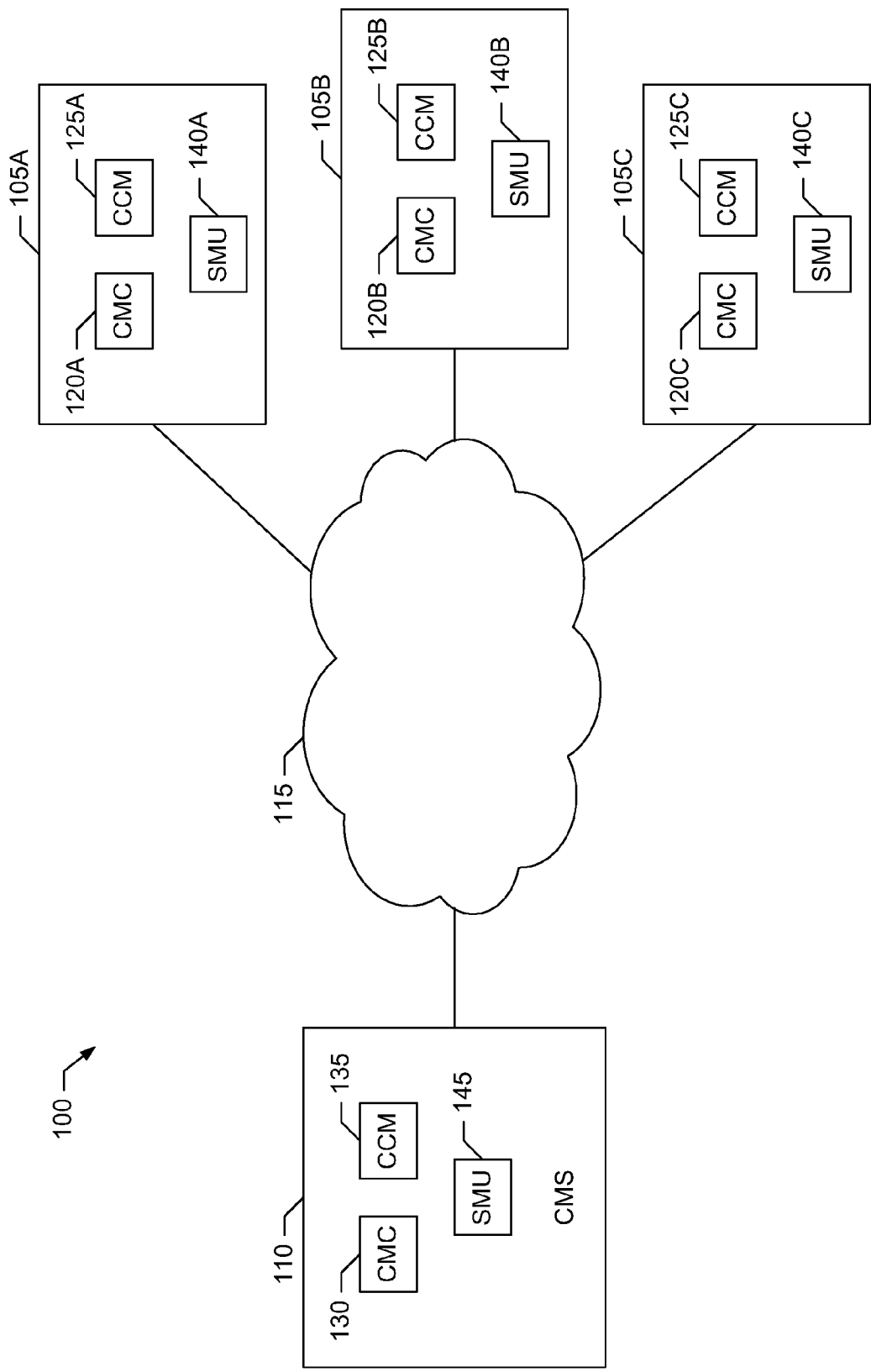
FIG. 1 illustrates a block diagram of an example business intelligence computing environment supporting service manipulation as described herein.

Methods and apparatus to manipulate services in a distributed business intelligence computing environment are disclosed herein. An example disclosed service manipulation unit allows dependency relationships to be specified between services included in a distributed computing environment implementing a business intelligence platform. The example service manipulation unit further enables invocation of operations to manipulate service operational states to be conditioned on the specified dependency relationships. For example, a specified dependency relationship may cause invocation of a first specified operation to manipulate an operational state of a child service to be conditioned on completion of a second specified operation to manipulate an operational state of a root, or other parent, service. In some example implementations, invocation of service manipulation operations may be further conditioned on a specified invocation order and/or on occurrence of a specified time interval. Examples of service manipulation operations supported by an example implementation of the disclosed service manipulation unit include server stop operations, server start operations, server disable operations, server enable operations, etc.

In an example implementation, a service manipulation unit implemented according to the methods and/or apparatus described herein is configured for use in a BusinessObject™ Enterprise business intelligence platform. As described above, the BusinessObjects™ Enterprise platform includes a variety of servers, implemented as services in a Microsoft Windows™ environment, to perform data collection, integration, analysis, and presentation. Additionally, utilities such as a Central Configuration Manager (CCM) and a Central Management Console (CMC) are provided to support server manipulation, such as stopping and starting and/or disabling and enabling of servers (such as Windows™ services) implementing the BusinessObjects™ Enterprise platform.

However, unlike the example disclosed service manipulation unit described above, the conventional CCM and CMC utilities provided in a BusinessObjects™ Enterprise business intelligence platform do not support server manipulation at particular time intervals or based on a specified time schedule. Furthermore, the conventional CCM and CMC utilities do not allow server manipulation dependencies to be specified such that invocation of service manipulation operations may be conditioned on the specified dependencies. Additionally, in the context of a Windows™ service implementation, the Windows™ "net stop <service>" and "net start <service>" commands (which could be scheduled for execution via the Windows™ Task Scheduler) do not allow dependency relationships between services to be specified and do not provide interfaces for inclusion in a service manipulation utility. In contrast, an example service manipulation unit implemented according to the methods and/or apparatus described herein supports server manipulation based on a specified time schedule and conditioned on specified server dependencies.

In the following, example service manipulation methods and apparatus are described in the context of operation in a business intelligence computing environment implementing the BusinessObjects™ Enterprise platform. However, the example service manipulation methods and apparatus described herein may be readily adapted for use in any type of business intelligence or other distributed computing environment. Also, unless otherwise indicated, the terms "server" and "service" are used interchangeably in the following descriptions.

Turning to the figures, a block diagram of an example distributed computing environment 100 implementing an example BusinessObjects™ Enterprise business intelligence computing platform is illustrated in FIG. 1. The example distributed computing environment 100 includes a plurality of computing devices 105A, 105B and 105C implementing a plurality of servers to perform data collection, integration, analysis, presentation, etc. In the illustrated example, the computing devices 105A, 105B and 105C are implemented using Windows™ compatible computing devices, such as personal computers, workstations, personal digital assistants (PDAs), mobile telephones, etc. As such, the example computing devices 105A, 105B and 105C each execute one or more Windows™ services to implement the plurality of servers. In another example implementation, one or more of the computing devices 105A, 105B and 105C are implemented using UNIX compatible computing devices that execute one or more daemons to implement one or more of the plurality of servers. Other types of computing devices and server implementations are also contemplated by the example methods and apparatus described herein.

Additionally, in the illustrated example, some or all of the example computing devices 105A, 105B and 105C, and/or other computing devices (not shown), implement a plurality of client interfaces to allow users to access the BusinessObjects™ Enterprise business intelligence platform implemented by the example distributed computing environment 100. In the illustrated example, each user is able to access the business intelligence application environment through a web browser interface operating on the user's computer or terminal (not shown), or operating on one or more of the example computing devices 105A, 105B and 105C.

The example distributed computing environment 100 of FIG. 1 also includes a Central Management Server (CMS) 110 to provide overall system management and to which the other servers 105A, 105B and 105C connect and undergo authentication. In the context of the illustrated example BusinessObjects™ Enterprise platform, the CMS 110 maintains a database of information concerning users, groups, security levels, content, servers, etc., associated with the distributed computing environment 100. Although depicted as a stand-alone server in the illustrated example, the CMS 110 may be implemented as one or more Windows™ services executing on a Windows™ compatible computing device, as one or more daemons executing on a UNIX compatible computing device, or using any other type of server technology.

To access the information maintained by the example CMS 110, the example computing devices 105A, 105B and 105C are communicatively coupled to the CMS 110 (or the computing device implementing the CMS 110), as well as each other, using an example network 115. The example network 115 may be implemented by any type of network, such as a local area network (LAN), wide area network (WAN), wireless LAN and/or WAN, cellular network, the Internet, etc., and/or any combination thereof.

To perform conventional service manipulation of the plurality of servers implemented by the example computing devices 105A, 105B and 105C, as well server/service manipulation associated with the example CMS 110, the example distributed computing environment 100 includes utilities such as the CMC and the CCM described above. In the illustrated example of FIG. 1, and without loss of generality, the distributed computing environment 100 is depicted as including a CMC and a CCM in each of the example computing devices 105A, 105B and 105C. In particular, the example computing device 105A includes a CMC 120A and a CCM 125B, the example computing device 105B includes a CMC 120B and a CCM 125B, and the example computing device 105C includes a CMC 120C and a CCM 125C. Additionally, the example CMS 110 (or the computing device implementing the CMS 110) also includes a CMC 130 and a CCM 135.

In the illustrated example, a CMC, such as the CMC 120A, 120B, 120C and/or 130, allows an authenticated user to manipulate operation of local and remote servers, such as BusinessObjects™ dependent Windows™ services, through a web browser interface. For example, and with reference to the example computing device 105A, the example CMC 120A may be used by an authenticated user to disable, enable, stop, start, etc., local services executing on the local computing device 105A, as well as remote services executing on the remote computing devices 105B and 105C. However, in the illustrated example, the CMC 120A (as well as the CMC 120B, 120C and 130) cannot be used to manipulate the example CMS 110. This is because the example CMC 120A needs to access the example CMS 110 to obtain server-related (or service-related) information, for example, to allow the services undergoing manipulation to be identified and located.

In the illustrated example, a CCM, such as the CCM 125A, 125B, 125C and/or 135, is a client application that also allows a user to manipulate operation of services. However, the scope of a CCM is limited to manipulating operation of some services on only one machine at a time. For example, and with reference to the example computing device 105A, the example CCM 125A may be used by a user to disable, enable, stop, start, etc., local services executing on the local computing device 105A, as well as remote services executing on the remote computing devices 105B and 105C (or on the CMS 110 or the computing device implementing the CMS 110). However, while the example CCM 125A can disable or enable any BusinessObjects™ service attached through the example CMS 110 at any given time, the example CCM 125A can start and stop a BusinessObjects™ service on only a single network-attached machine at any given time. Additionally, in the illustrated example, the CCM 135 can be used to disable, enable, stop, start, etc., services executing on the CMS 110 (or executing on an associated computing device to implement the CMS 10).

As discussed above, the conventional CMC and CCM implementations do not support service manipulation based on a specified time schedule or conditioned on specified service dependencies. Thus, to perform service manipulation based on one or more specified time schedules and/or conditioned on specified service dependencies, the example distributed computing environment 100 includes one or more service manipulation units (SMUs). In the illustrated example of FIG. 1, and without loss of generality, the distributed computing environment 100 is depicted as including an SMU in each of the example computing devices 105A, 105B and 105C. In particular, the example computing device 105A includes an SMU 140A, the example computing device 105B includes an SMU 140B, and the example computing device 105C includes an SMU 140C. Additionally, the example CMS 110 (or the computing device implementing the CMS 110) includes an SMU 145.

In the illustrated example, each SMU 140A, 140B, 140C and 145 is implemented as a thick client interface allowing a user to setup one or more distributed computing environments 100 (implementing, for example, one or more respective BusinessObjects™ Enterprise platforms) for service manipulation. In an example implementation, each distributed computing environment 100 is managed via a separate instance of an SMU. For a particular selected environment, the corresponding instance of the SMU allows an authenticated administrator to disable, enable, stop, start, etc., or, more generally, manipulate operation of any or all BusinessObjects™ servers/services and/or supporting services remotely from a single location. In example implementations having multiple SMUs, some of the SMUs may be configured to operate independently, whereas other SMUs may be configured to coordinate their respective activities through a centralized configuration database or other centralized facility.

For example, and with reference to the example computing device 105A, an authenticated administrator can use a first instance of the example SMU 140A to specify a time dependent schedule for manipulation of services in the example distributed computing environment 100. For example the administrator could use the example SMU 140A to specify a time dependent schedule for disabling one or more specified services at a first time, stopping the specified service(s) at a later second time, and then starting and enabling the specified service(s) at yet another later third time. Additionally, the administrator could use the example SMU 140A to specify dependency relationships between services. Together, these features of the example SMU 140A allow the administrator to specify a time schedule for service manipulation that is further conditioned on any dependency relationships specified for the services.

As an illustrative example, which is in no way meant to be limiting, consider a scenario in which service B is executing on the example computing device 105B needs to be stopped. However, for proper system operation, service C, which is executing on the example computing device 105C, should be disabled before service B is stopped. Additionally, assume that service C cannot be disabled until at least 3:00 AM. Using the example SMU 140A associated with the example computing device 105A, an authenticated administrator could specify that service C is to be disabled through invocation of an appropriate disable operation at 3:00 AM. Additionally, the administrator could use the example SMU 140A to specify that service B is to be stopped through invocation of an appropriate stop operation dependent only upon completion of the disable operation invoked for service C, such that service C is disabled. As this example illustrates, the example SMU 140A allows the administrator to specify a particular service manipulation schedule and associated dependency relationships in advance. Such an example SMU 140A can then perform service manipulation independent of the administrator's presence.

Figure 2:
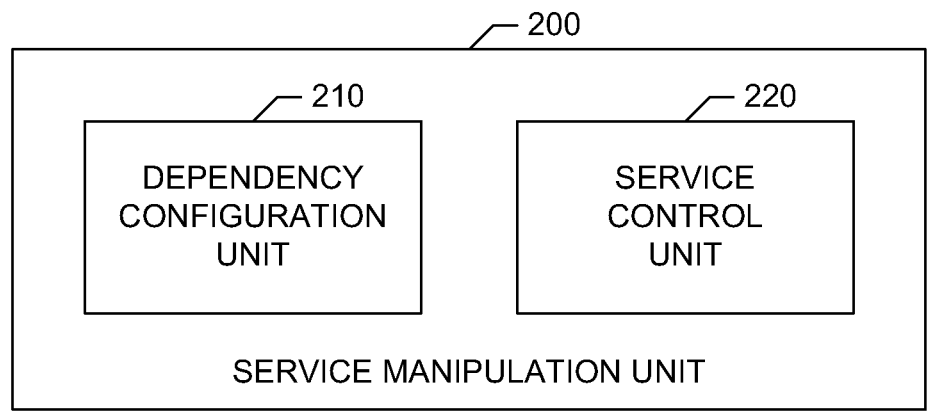
FIG. 2 illustrates a block diagram of an example service manipulation unit for use in the example business intelligence computing environment of FIG. 1.

A block diagram of an example SMU 200 that may be used to implement any or all of the example SMUs 140A, 140B, 140C and/or 145 of FIG. 1 is illustrated in FIG. 2. The example SMU 200 of FIG. 2 includes a dependency configuration unit 210 to allow specification of dependency relationships between services, for example, implementing an example BusinessObjects™ business intelligence platform in the example distributed computing environment 100 of FIG. 1. In the illustrated example, the dependency relationships specified by the dependency configuration unit 210 are used by a service control unit 220 included in the example SMU 200 to condition invocation of service manipulation operations on the specified dependencies.

In an example implementation, the dependency configuration unit 210 operates to specify dependency relationships between two or more services. To specify a dependency relationship among a particular set of services, the example dependency configuration unit 210 operates to specify a first operation to manipulate an operational state of a first service in the set of services and a second operation to manipulate an operational state of a second service in the set of services. The example dependency configuration unit 210 further operates to specify a dependency requirement that the first specified operation to manipulate the first service is to complete before the second specified operation is to be invoked to manipulate the second service. Such dependencies may be also specified between the first service and other services in the set to allow configuration of one-to-many dependency relationships. In this way, the example dependency configuration unit 210 allows specification of dependency relationships to condition invocation of specified service manipulation operations, such as stop, start, disable and enable operations, on the completion of other specified service manipulation operations associated with the same or different services.

Additionally, in at least some example implementations, the dependency configuration unit 210 operates to further specify a second requirement that the first specified operation to manipulate the first service and the second specified operation to manipulate the second service (and possibly other specified operations to manipulate other services in the case of one-to-many dependency relationships) are to be invoked during a specified time interval. In this way, the example dependency configuration unit 210 allows specification of a time dependent schedule for invocation of service manipulation operations. Furthermore, in at least some example implementations, the dependency configuration unit 210 operates to specify an order of invocation for service manipulation operations associated with services which are not dependent upon each other, but which depend from another common service. In this way, the example dependency configuration unit 210 allows specification of an order in which service manipulation operations are to be invoked for multiple services even when no dependency relationship(s) exist between such services.

As mentioned above, the example service control unit 220 included the example SMU 200 uses the dependency relationships specified by the dependency configuration unit 210 to condition invocation of service manipulation operations on the specified dependencies. In an example implementation, the example service control unit 220 evaluates a dependency relationships specified for a set of services to determine which is the first service of the pair that is not dependent on the other service(s) in the set, and which services in the set depend on the first service. The example service control unit 220 then invokes a first specified service manipulation operation to manipulate the first (independent) service and waits for the first service manipulation operation to complete. When the first service manipulation operation completes, the example service control unit 220 invokes a second specified service manipulation operation to manipulate the second (dependent) service. Such conditional service invocation continues for other services that are dependent on the first service. In this way, the example service control unit 220 invokes service manipulation operations based on the specified dependency relationships among sets of services.

Additionally, in at least some example implementations the service control unit 220 invokes the first service manipulation operation to manipulate the first (independent) service, and possibly the second (dependent) service manipulation operation, only during a time interval specified using the example dependency configuration unit 210. In this way, the example service control unit 220 can perform service manipulation at a specified time without user intervention and without requiring a user's presence. Furthermore, in at least some example implementations, the service control unit 220 invokes service manipulation operations according to an invocation order specified by using the example dependency configuration unit 210. In this way, the example service control unit 220 can invoke service manipulation operations for multiple services in a particular order even when no dependency relationship(s) exist between such services.

While an example manner of implementing the example SMUs 140A, 140B, 140C and/or 145 of FIG. 1 has been illustrated in FIG. 2, one or more of the elements, processes and/or devices illustrated in FIG. 2 may be combined, divided, re-arranged, omitted, eliminated and/or implemented in any other way. Further, the example dependency configuration unit 210, the example service control unit 220 and/or, more generally, the example SMU 200 of FIG. 2 may be implemented by hardware, software, firmware and/or any combination of hardware, software and/or firmware. Thus, for example, any of the example dependency configuration unit 210, the example service control unit 220 and/or, more generally, the example SMU 200 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example SMU 200, the example dependency configuration unit 210 and/or the example service control unit 220 are hereby expressly defined to include a tangible medium such as a memory, digital versatile disk (DVD), compact disk (CD), etc., storing such software and/or firmware. Further still, the example SMU 200 of FIG. 2 may include one or more elements, processes and/or devices in addition to, or instead of, those illustrated in FIG. 2, and/or may include more than one of any or all of the illustrated elements, processes and devices.

Figure 3:
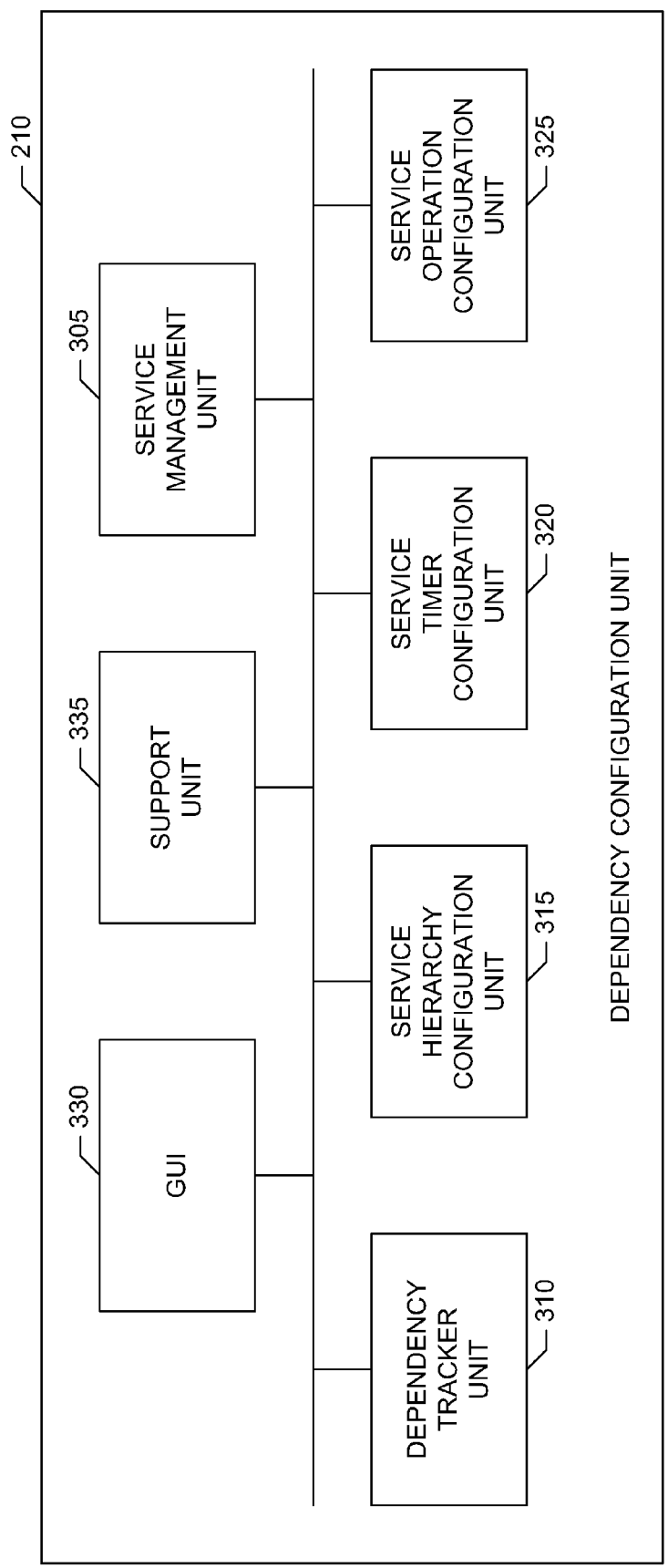
FIG. 3 illustrates a block diagram of an example dependency configuration unit that may be used to implement the example service manipulation unit of FIG. 2.

An example implementation of the dependency configuration unit 210 of FIG. 2 is illustrated in FIG. 3. The example dependency configuration unit 210 of FIG. 3 includes a service management unit 305 to manage dependency relationships specified for services in, for example, the example distributed computing environment 100 of FIG. 1. For a particular service, the service management unit 305 of the illustrated example operates to maintain dependency information specifying service manipulation operations to be invoked for the managed services and the dependency relationship(s) associated with the specified service manipulation operations. Additionally, in at least some example implementations the service management unit 305 also maintains time dependent schedule information specifying time intervals, such as time blocks, during which specified service manipulation operation(s) are to be invoked for each managed service. Furthermore, in at least some example implementations, the service management unit 305 also maintains invocation order information specifying an order of invocation for multiple services having no dependency relationship among themselves, but which have a dependency relationship with another service.

Figure 22:
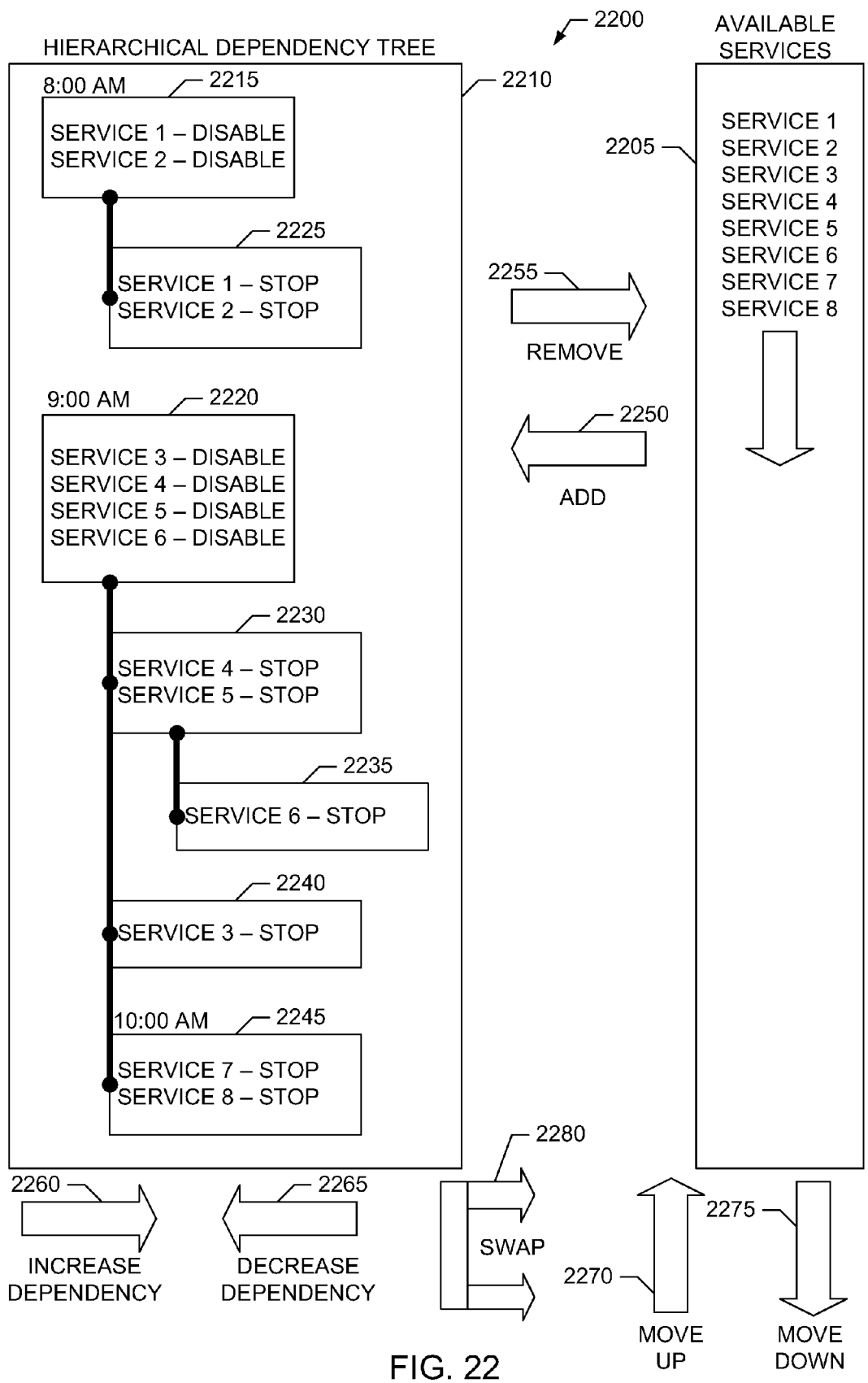
FIG. 22 illustrates a graphical user interface that may be implemented by the example dependency configuration unit of FIGS. 2 and/or 3 to maintain a hierarchical dependency structure specifying dependency relationships among services.

For example, the service management unit 305 operates to specify dependency relationships among the managed services using an example hierarchical tree structure. In an example implementation, the service management unit 305 utilizes a graphical user interface (GUI) 330 implementing, for example, the GUI 2200 illustrated in FIG. 22 to specify the dependency relationships among the managed services. In the example GUI 2200, a list of the managed services is provided in an available services list 2205. In such an example implementation, one or more services occupy a node in the tree hierarchy, such as the hierarchical dependency tree 2210. For example, the GUI 2200 includes add and remove utilities 2250 and 2255 to allow services to be added and removed from nodes in the example hierarchical dependency tree 2210. Nodes in the tree hierarchy are classified as either root nodes located at the lowest level in the hierarchy or child nodes located at higher levels in the hierarchy. Root nodes, such as the example root nodes 2215 and 2220 in the example hierarchical dependency tree 2210, are used to represent services for which invocation of service manipulation operations does not depend on other services, but which depends on occurrence of a particular time. In other words, root nodes are used to represent services that are time-dependent, but independent of other services. (As such, root services are also referred to as independent services due to their independence from other services, even though such services have a dependency on time). In the illustrated example, each root node in the example hierarchical tree structure is associated with a time block to specify a time interval during which a service manipulation operation for the service(s) occupying the root node is to be invoked. Furthermore, an invocation order for service manipulation operations associated with different services occupying root nodes having a common time block can be specified by a relative position of each root node in the example hierarchical tree structure. For example, service manipulation operations associated with different root nodes having a common time block may be invoked in order from left to right in the example hierarchical tree structure.

In the example hierarchical tree structure, child nodes, such as the example child nodes 2225, 2230, 2235, 2240 and 2245 in the example hierarchical dependency tree 2210, are used to represent services for which invocation of service manipulation operations does depend on other services. In other words, child nodes are used to represent dependent services. Additionally, a child node may also be a parent node having other child nodes which depend upon it. For example, in the example hierarchical dependency tree 2210, the example child node 2230 is a parent of the example child node 2235. Accordingly, each child node is associated with a respective dependency level indicating a number of other lower-level child nodes (or, equivalently, a number of parent nodes) from which the particular child node depends. Like the root nodes, each child node in the example hierarchical tree structure can be associated with a time block to specify a time interval during which a service manipulation operation (or operations) for the service(s) occupying the child node is(are) to be invoked. For example, the child node 2245 in the example hierarchical dependency tree 2210 is associated with a 10:00 AM time block. Usually, a particular child node will be associated with the same time block as its parent node (for example, a root node or a lower-level child node from which the particular child node depends). Furthermore, an invocation order for service manipulation operations associated with different services occupying child nodes having a common parent node, but which themselves are not interdependent, can be specified by a relative position of each child node in the example hierarchical tree structure. For example, service manipulation operations associated with different child nodes having a common parent node may be invoked in sequential order in the example hierarchical tree structure. For example, child nodes 2230 and 2240 have a common parent node 2220 in the example hierarchical dependency tree 2210, so unless otherwise specified, the service manipulation operations associated with the child node 2230 will be invoked before the service manipulation operations associated with the child node 2240 as the child node 2230 comes before the child node 2240 in the illustrated example.

The example dependency configuration unit 210 of FIG. 3 also includes a dependency tracker unit 310 to determine the dependency information, time dependent schedule information and invocation order information for use by the example service management unit 305. For example, the dependency tracker unit 310 is invoked when dependency, schedule and/or invocation order information for services managed by the example service management unit 305 is to be specified, updated, deleted, etc. In the illustrated example, the dependency tracker unit 310 operates to invoke a service hierarchy configuration unit 315 to determine dependency information and/or invocation order information. The example dependency tracker unit 310 also operates to invoke a service timer configuration unit 320 to determine time dependent schedule information. The example dependency tracker unit 310 further operates to invoke a service operation configuration unit 325 to determine service manipulation operations to be performed for the services managed by the example service management unit 305.

The example service hierarchy configuration unit 315 operates to determine dependency information and invocation order information associated with service manipulation operations to be invoked to manipulate the services managed by the example service management unit 305. In the illustrated example, the service hierarchy configuration unit 315 is configured to determine the dependency information and invocation order information to be compatible with the example hierarchical tree structure specified and maintained by the example service hierarchy configuration unit 315. Accordingly, the example service hierarchy configuration unit 315 implements utilities to assign selected independent services to corresponding root nodes in the hierarchy and selected dependent services to corresponding child nodes in the hierarchy. Additionally, such utilities allow dependency levels associated with the selected child nodes to be specified and the selected child nodes to be linked to associated selected parent nodes to specify the dependency relationship between such parent and child nodes. Other utilities allow specification of an invocation order of selected root nodes, as well as invocation orders for selected sets of child nodes each having a respective common parent node.

Furthermore, the example service hierarchy configuration unit 315 includes utilities to update the example hierarchical tree structure maintained by the example service hierarchy configuration unit 315. For example, the illustrated service hierarchy configuration unit 315 includes a utility, such as the increase dependency utility 2260 depicted in the example GUI 2200 of FIG. 22, to increase a dependency level of a selected node in the hierarchy such that the selected node can be updated (or repositioned) to be a child node dependent on another node. A counterpart utility to decrease the dependency level of a selected node in the hierarchy, such as the decrease dependency utility 2265 depicted in the example GUI 2200, operates to remove a dependency relationship of the selected child node such that the selected child node no longer depends on an associated parent node. If the selected child node was a grandchild of a grandparent node, the child node will be made a sibling of its former parent node, and its former grandparent node will become its new parent node. The example service hierarchy configuration unit 315 includes still other utilities, such as the move up and move down utilities 2270 and 2275 depicted in the example GUI 2200, to adjust the invocation order of a selected root node or a selected child node. The service hierarchy configuration unit 315 of the illustrated example also includes a utility to swap selected pairs of nodes in the example hierarchical tree structure, such as the swap utility 2280 depicted in the example GUI 2200, with the selected pair of nodes allowed to be any pair of root nodes, child nodes or combination of a root node and a child node.

The example service timer configuration unit 320 operates to determine time dependent schedule information associated with service manipulation operations to be invoked to manipulate the services managed by the example service management unit 305. In the illustrated example of FIG. 3, the service timer configuration unit 320 is configured to determine the schedule information to be compatible with the example hierarchical tree structure specified and maintained by the example service hierarchy configuration unit 315. Accordingly, the example service timer configuration unit 320 implements utilities to assign a selected root node in the hierarchy and, thus, the service(s) occupying the selected root node, to a specified time block. Additionally, such utilities allow a selected child node in the hierarchy and, thus, the service(s) occupying the selected child node, to be assigned to a specified time block, which is usually the same time block assigned to the parent node of the selected child node. Other utilities allow new time blocks to be created and time block assignments to be updated or deleted.

In an example implementation, time blocks have a specified interval granularity, such as 15 minutes, 30 minutes, 1 hour, etc. In such an example, a time block is specified by its start time. When the start time specified for a particular time block occurs, service manipulation operation(s) associated with the service(s) occupying the root node(s) assigned to the particular time block will be invoked. If more than one root node is assigned to the same time block, the order of invocation of service manipulation operations associated with these root nodes is determined based on the position of the root nodes in the hierarchical tree structure as specified by the example service hierarchy configuration unit 315. Upon completion of the service manipulation operation(s) invoked for the root node(s) assigned to the particular time block, any child node(s) depending on such root node(s) and assigned to the same particular time block will be processed. The service manipulation operation(s) for service(s) assigned to such child node(s) will be invoked accordingly. The process continues if any of the child node(s) are configured as parent node(s) for further child node(s). At any point, if a dependency is satisfied for a particular child node but the child node is assigned to a time block that has not occurred, the service manipulation operation(s) associated with such a child node will not be invoked until the assigned time block occurs.

The example service operation configuration unit 325 operates to determine the service manipulation operations to be invoked to manipulate the services managed by the example service management unit 305. For example, the service management unit 305 associates one or more specified service manipulation operations with one or more selected services. Examples of service manipulation operations include (1) a stop operation to be invoked to stop execution of a selected service, (2) a start operation to be invoked to start execution of a selected service, (3) a disable operation to be invoked to disable a selected service from receiving and responding to service requests while allowing the selected service to continue executing, (4) an enable operation to be invoked to enable a selected service that is disabled, etc.

The example dependency configuration unit 210 of FIG. 3 further includes the example GUI 330 to allow information to be received from and presented to a user. In the illustrated example, the GUI 330 is configured to access the existing hierarchical tree structure maintained by the example service management unit 305 to implement the example GUI 2200 illustrated in FIG. 22. The existing hierarchical tree structure is then displayed to the user via the GUI 330 to allow the user to view the existing dependency relationships, time dependent schedules, invocation orders, etc., associated with services in the example distributed computing environment 100. The example GUI 330 is also configured to invoke the example dependency tracker unit 210 and accept input information to be processed by the example service hierarchy configuration unit 315, the example service timer configuration unit 320 and the example service operation configuration unit 325.

The example dependency configuration unit 210 of FIG. 3 also includes a support unit 335 implementing a variety of support utilities. In the illustrated example, the support unit 335 implements an authentication utility to allow a user to be authenticated before being allowed to access the example dependency configuration unit 210. Such an authentication utility may be implemented using any appropriate technique, such as, but not limited to, a password authentication technique, a biometric authentication technique, a smart card, etc. In the illustrated example, the support unit 335 also implements a data storage utility, for example, to allow the example hierarchical tree structure maintained by the example service management unit 305 to be stored in any appropriate database or other storage configuration.

While an example manner of implementing the dependency configuration unit 210 of FIG. 2 has been illustrated in FIG. 3, one or more of the elements, processes and/or devices illustrated in FIG. 3 may be combined, divided, re-arranged, omitted, eliminated and/or implemented in any other way. Further, the example service management unit 305, the example dependency tracker unit 310, the example service hierarchy configuration unit 315, the example service timer configuration unit 320, the example service operation configuration unit 325, the example GUI 330, the example support unit 335 and/or, more generally, the example dependency configuration unit 210 of FIG. 3 may be implemented by hardware, software, firmware and/or any combination of hardware, software and/or firmware. Thus, for example, any of the example service management unit 305, the example dependency tracker unit 310, the example service hierarchy configuration unit 315, the example service timer configuration unit 320, the example service operation configuration unit 325, the example GUI 330, the example support unit 335 and/or, more generally, the example dependency configuration unit 210 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example dependency configuration unit 210, the example service management unit 305, the example dependency tracker unit 310, the example service hierarchy configuration unit 315, the example service timer configuration unit 320, the example service operation configuration unit 325, the example GUI 330 and/or the example support unit 335 are hereby expressly defined to include a tangible medium such as a memory, digital versatile disk (DVD), compact disk (CD), etc., storing such software and/or firmware. Further still, the example dependency configuration unit 210 of FIG. 3 may include one or more elements, processes and/or devices in addition to, or instead of, those illustrated in FIG. 3, and/or may include more than one of any or all of the illustrated elements, processes and devices.

Figure 4:
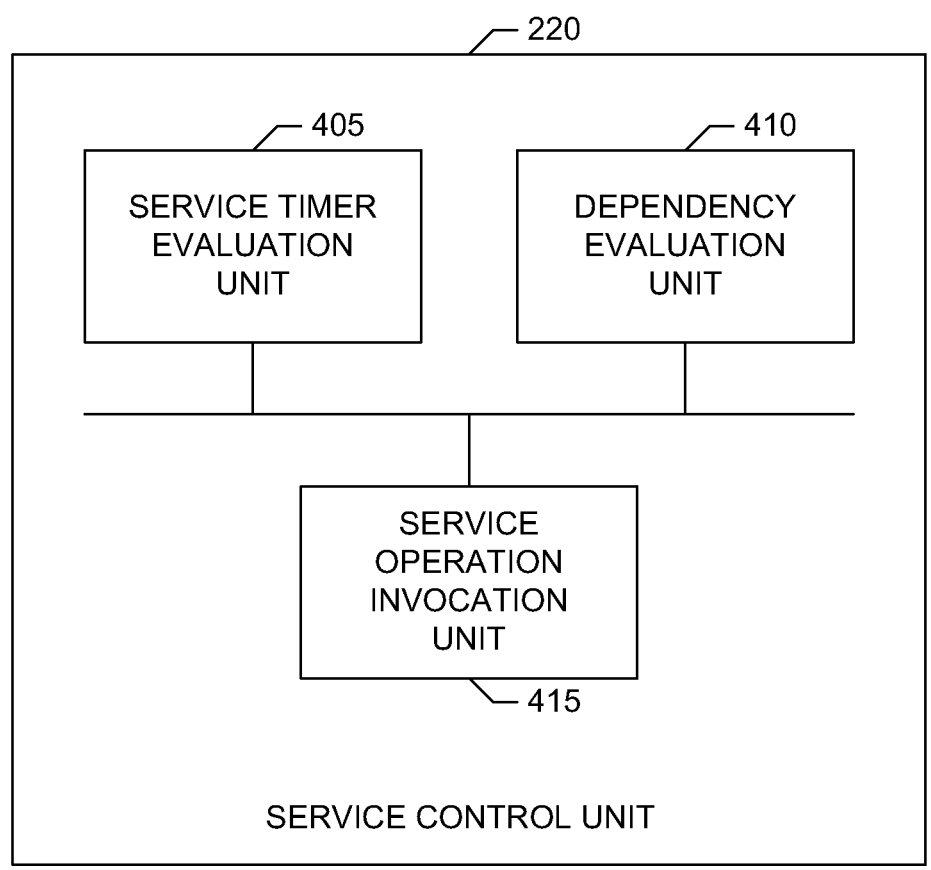
FIG. 4 illustrates a block diagram of an example service control unit that may be used to implement the example service manipulation unit of FIG. 2.

An example implementation of the service control unit 220 of FIG. 2 is illustrated in FIG. 4. The example service control unit 220 of FIG. 4 includes a service timer evaluation unit 405 to implement one or more service timers to track one or more time blocks specified, for example, by the example dependency configuration unit 210. The example service timer evaluation unit 405 may be implemented by any type of clock or timer utility supporting the resolution of the specified time blocks.

The example service control unit 220 of FIG. 4 also includes a dependency evaluation unit 410 to condition invocation of service manipulation operations on dependencies specified, for example, by an example hierarchical tree structure maintained by the example dependency configuration unit 210. In the illustrated example, when the example service timer evaluation unit 405 indicates that a particular time block has occurred, the dependency evaluation unit 410 is invoked to evaluate any dependency relationships for any root node(s) in the example hierarchical tree structure associated with the current time block. For any such root node(s), the example dependency evaluation unit 410 causes an example service operation invocation unit 415 to invoke one or more service manipulation operations to manipulate the operational state(s) of the service(s) occupying the subject root node(s). Additionally, the example dependency evaluation unit 410 may condition operation of the example service operation invocation unit 415 on any invocation order specified for the subject root nodes.

The dependency evaluation unit 410 of the illustrated example also identifies any child node(s) specified as having a dependency relationship with the root node(s) associated with the current time block. For each such child node, the example dependency evaluation unit 410 waits for the service manipulation operation(s) invoked for the child node's associated parent root node to complete, thereby satisfying the specified dependency relationship. When a specified dependency relationship associated with a particular child node is satisfied, the example dependency evaluation unit 410 causes the example service operation invocation unit 415 to invoke one or more service manipulation operations to manipulate the operational state(s) of the service(s) occupying the particular child node. Additionally, the example dependency evaluation unit 410 may condition operation of the example service operation invocation unit 415 on occurrence of a time block specified for the particular child node and/or on any invocation order specified for the child node.

The dependency evaluation unit 410 of the illustrated example further operates to continue identifying child node(s) at higher dependency levels which are linked to the root node(s) associated with the current time through other intervening child node(s) (and, thus, acting as associated parent node(s)). The example dependency evaluation unit 410 processes these higher level child node(s) similar to how it processed the lower level child node(s). For example, the dependency evaluation unit 410 determines whether the specified dependency relationship(s) associated with a particular higher level child node is satisfied and, if so, causes the example service operation invocation unit 415 to invoke one or more service manipulation operations to manipulate the operational state(s) of the service(s) occupying the particular higher level child node. Additionally, the example dependency evaluation unit 410 may condition operation of the example service operation invocation unit 415 on occurrence of a time block specified for the particular higher level child node and/or on any invocation order specified for the higher level child node.

In the illustrated example, the preceding operation of the dependency evaluation unit 410 is repeated each time the example service timer evaluation unit 405 indicates that a new time block has occurred.

As discussed above, examples of the service manipulation operations that may be invoked by the example service operation invocation unit 415 include (1) a stop operation to stop execution of a service, (2) a start operation to start execution of a service, (3) a disable operation to disable a service from receiving and responding to service requests while allowing the service to continue executing, (4) an enable operation to enable a service that is disabled, etc.

While an example manner of implementing the service control unit 220 of FIG. 2 has been illustrated in FIG. 4, one or more of the elements, processes and/or devices illustrated in FIG. 4 may be combined, divided, re-arranged, omitted, eliminated and/or implemented in any other way. Further, the example service timer evaluation unit 405, the example dependency evaluation unit 410, the example service operation invocation unit 415 and/or, more generally, the example service control unit 220 of FIG. 4 may be implemented by hardware, software, firmware and/or any combination of hardware, software and/or firmware. Thus, for example, any of the example service timer evaluation unit 405, the example dependency evaluation unit 410, the example service operation invocation unit 415 and/or, more generally, the example service control unit 220 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example service control unit 220, example service timer evaluation unit 405, the example dependency evaluation unit 410 and/or the example service operation invocation unit 415 are hereby expressly defined to include a tangible medium such as a memory, digital versatile disk (DVD), compact disk (CD), etc., storing such software and/or firmware. Further still, the example service control unit 220 of FIG. 4 may include one or more elements, processes and/or devices in addition to, or instead of, those illustrated in FIG. 4, and/or may include more than one of any or all of the illustrated elements, processes and devices.

Flowcharts representative of example machine readable instructions that may be executed to implement the example SMUs 140A, 140B, 140C, 145 and/or 200, the example dependency configuration unit 210, the example service control unit 220, the example service management unit 305, the example dependency tracker unit 310, the example service hierarchy configuration unit 315, the example service timer configuration unit 320, the example service operation configuration unit 325, the example GUI 330, the example support unit 335, the example service timer evaluation unit 405, the example dependency evaluation unit 410 and/or the example service operation invocation unit 415 are shown in FIGS. 5-8 and 20. In these examples, the machine readable instructions represented by each flowchart may comprise one or more programs for execution by: (a) a processor, such as the processor 2112 shown in the example computer 2100 discussed below in connection with FIG. 21, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 2112, but the entire program or programs and/or portions thereof could alternatively be executed by a device other than the processor 2112 and/or embodied in firmware or dedicated hardware (e.g., implemented by an application specific integrated circuit (ASIC), a programmable logic device (PLD), a field programmable logic device (FPLD), discrete logic, etc.). For example, any or all of the example SMUs 140A, 140B, 140C, 145 and/or 200, the example dependency configuration unit 210, the example service control unit 220, the example service management unit 305, the example dependency tracker unit 310, the example service hierarchy configuration unit 315, the example service timer configuration unit 320, the example service operation configuration unit 325, the example GUI 330, the example support unit 335, the example service timer evaluation unit 405, the example dependency evaluation unit 410 and/or the example service operation invocation unit 415 could be implemented by any combination of software, hardware, and/or firmware. Also, some or all of the machine readable instructions represented by the flowcharts of FIGS. 5-8 and 20 may be implemented manually. Further, although the example machine readable instructions are described with reference to the flowcharts illustrated in FIGS. 5-8 and 20, many other techniques for implementing the example methods and apparatus described herein may alternatively be used. For example, with reference to the flowcharts illustrated in FIGS. 5-8 and 20, the order of execution of the blocks may be changed, and/or some of the blocks described may be changed, eliminated, combined and/or subdivided into multiple blocks.

Figure 5:
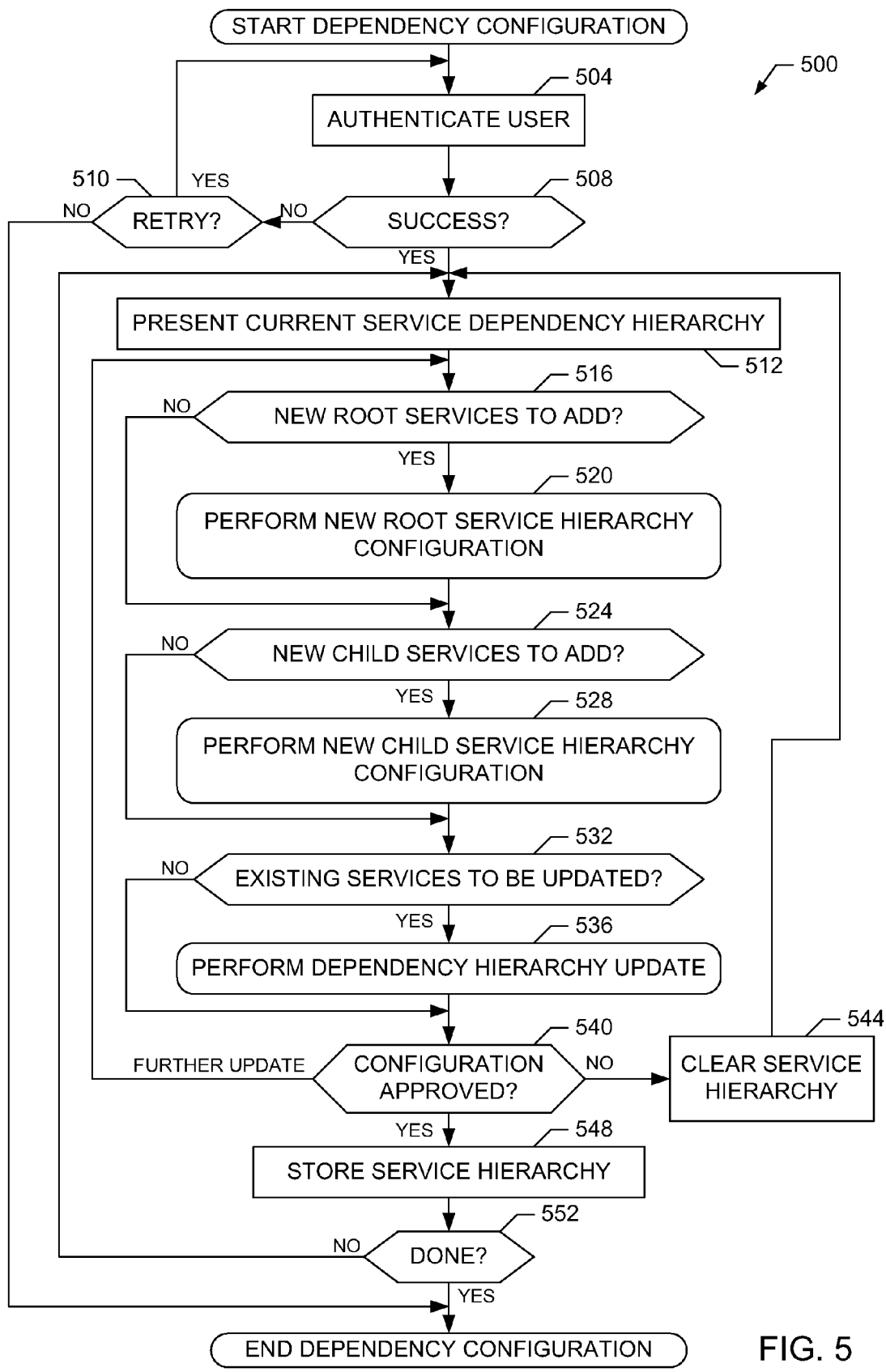
FIG. 5 illustrates a flowchart representative of example machine readable instructions to perform a dependency configuration procedure that may be executed to implement the example dependency configuration unit of FIGS. 2 and/or 3.

Example machine readable instructions 500 to perform an example dependency configuration procedure that may be executed to implement the example dependency configuration unit 210 included in the example SMU 200 of FIG. 2 are represented by the flowchart shown in FIG. 5. The example machine readable instructions 500 may be executed, for example, when one or more new root services (or nodes) are to be added to an example hierarchical dependency tree maintained by the example dependency configuration unit 210, when one or more new child services (or nodes) are to be added to the example hierarchical dependency tree, when the example hierarchical dependency tree is to be updated, etc., or any combination thereof. Turning to FIG. 5, the example machine readable instructions 500 begin execution at block 504 at which the example dependency configuration unit 210 authenticates a user attempting to access the example SMU 200. For example, at block 504 the example support unit 335 included in the example dependency configuration unit 210 may be used to authenticate the user via any appropriate technique, such as, but not limited to, a password authentication technique, a biometric authentication technique, a smart card, etc.

Next, at block 508 the example dependency configuration unit 210 determines whether user authentication at block 504 was successful. If user authentication was not successful (block 508), control proceeds to block 510 at which the example dependency configuration unit 210 determines whether to retry authentication of user (such as based on a configured number of allowed authentication retries). If authentication is to be retried (block 510) control returns to block 504. If authentication is not to be retried (block 510) execution of the example machine readable instructions 500 ends. However, if user authentication was successful (block 508), control proceeds to block 512 at which the example dependency configuration unit 210 presents the current hierarchical dependency tree structure to the authenticated user. For example, at block 512 the example GUI 330 included in the example dependency configuration unit 210 may be used to display the current hierarchical dependency tree structure to the user in a graphical format. Such a graphical display allows the user to readily view the existing dependency relationships, time dependent schedules, invocation orders, etc., associated with services in the example distributed computing environment 100. After presenting the current hierarchical dependency tree structure to the authenticated user at block 512, the example dependency configuration unit 210 waits for the user to input information via, for example, the GUI 330 to further configure the example hierarchical dependency tree structure.

Figure 6:
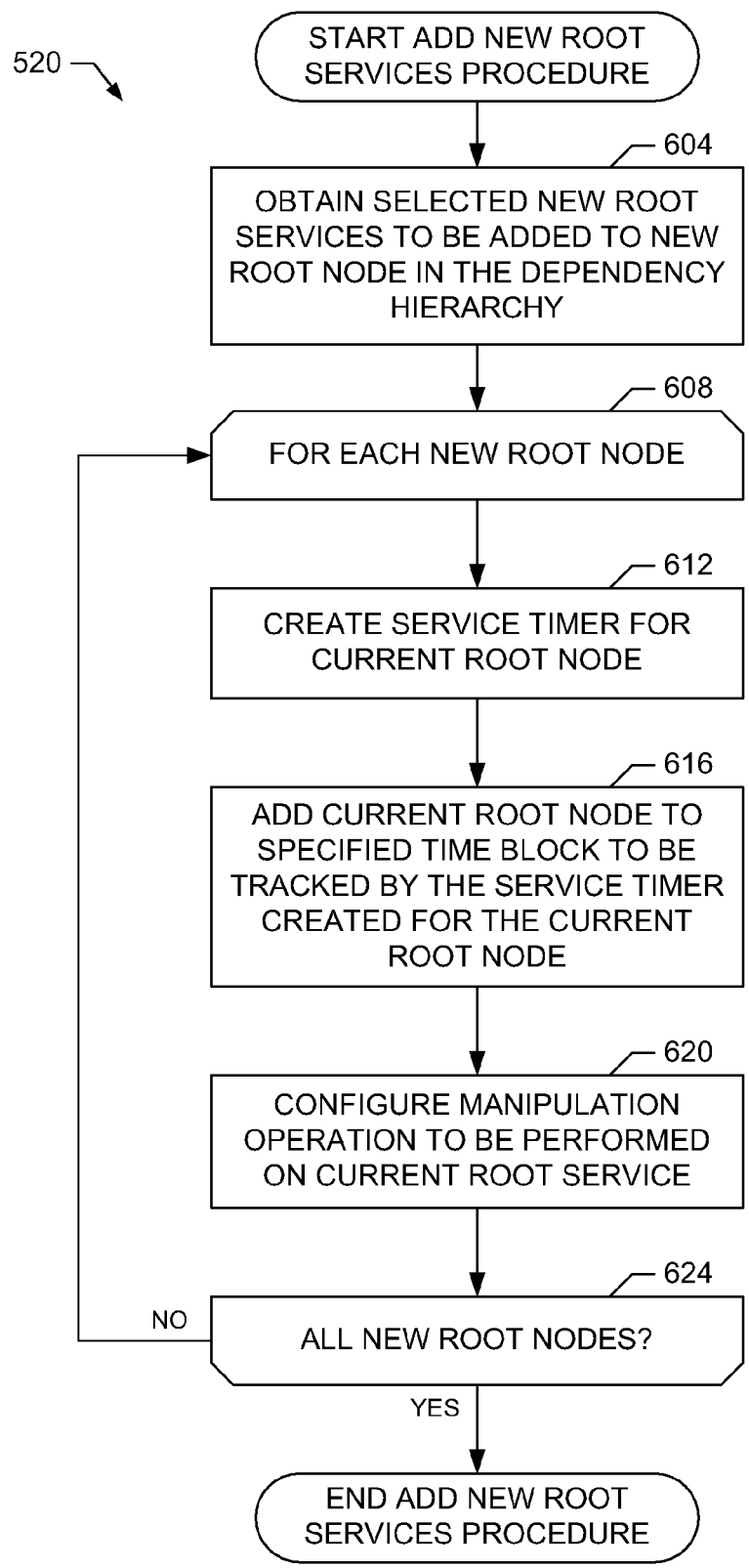
FIG. 6 illustrates a flowchart representative of example machine readable instructions to perform an add new root services configuration procedure that may be used to implement the example machine readable instructions of FIG. 5 and/or executed to implement the example dependency configuration unit of FIGS. 2 and/or 3.

Assuming information is input by the user, control proceeds to block 516 at which the example dependency configuration unit 210 determines whether the input information indicates that one or more services have been selected for addition to the example hierarchical dependency tree as root services. If new root service(s) are to be added (block 516), control proceeds to block 520 at which the example dependency configuration unit 210 performs a configuration procedure to add the selected service(s) as new root services in the example hierarchical dependency tree. Example machine readable instructions to implement the processing at block 520 are illustrated in FIG. 6 and discussed in greater detail below.

Figure 7:
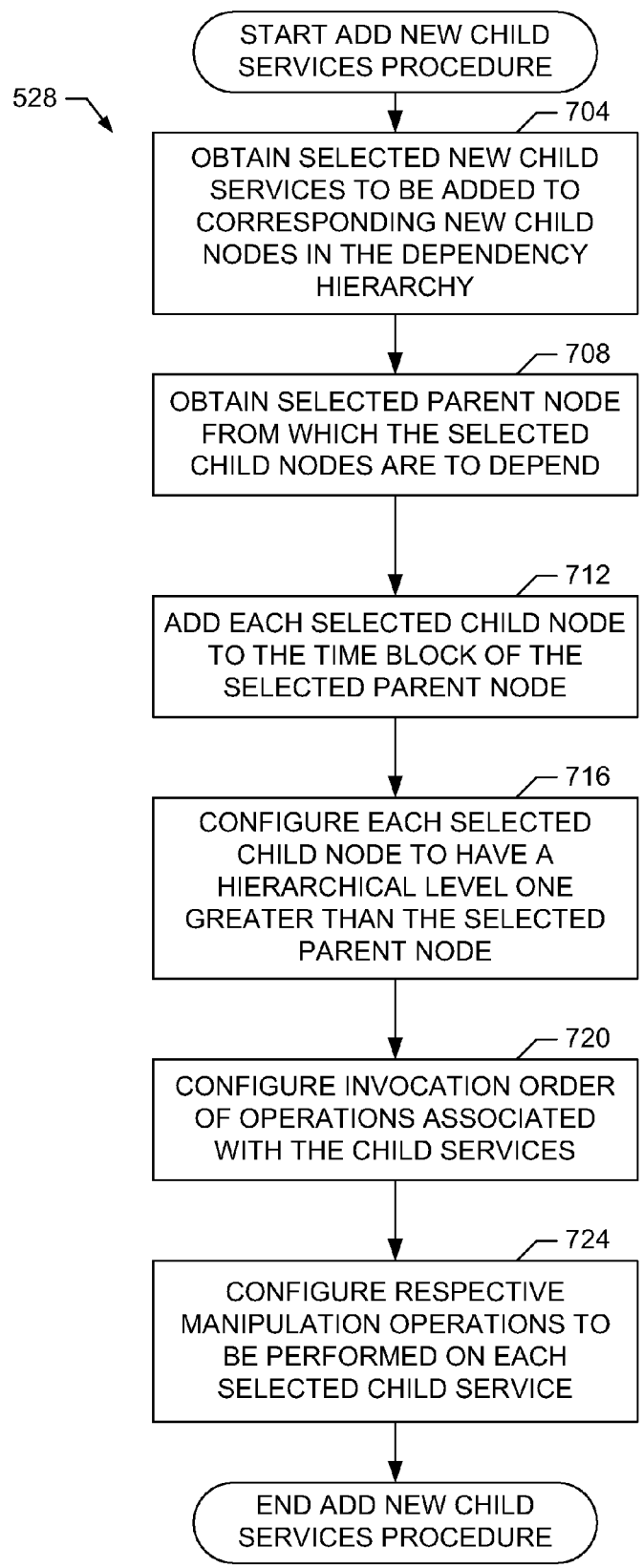
FIG. 7 illustrates a flowchart representative of example machine readable instructions to perform an add new child services configuration procedure that may be used to implement the example machine readable instructions of FIG. 5 and/or executed to implement the example dependency configuration unit of FIGS. 2 and/or 3.

After processing at block 520 completes, or if the input information does not indicate that new root service(s) are to be added to the example hierarchical dependency tree (block 516), control proceeds to block 524 at which the example dependency configuration unit 210 determines whether the input information indicates that one or more services have been selected for addition to the example hierarchical dependency tree as child service(s) (or as a child node containing services). If new child service(s) are to be added (block 524), control proceeds to block 528 at which the example dependency configuration unit 210 performs a configuration procedure to add the selected service(s) as new child service(s) in the example hierarchical dependency tree. Example machine readable instructions to implement the processing at block 528 are illustrated in FIG. 7 and discussed in greater detail below.

Figure 8:
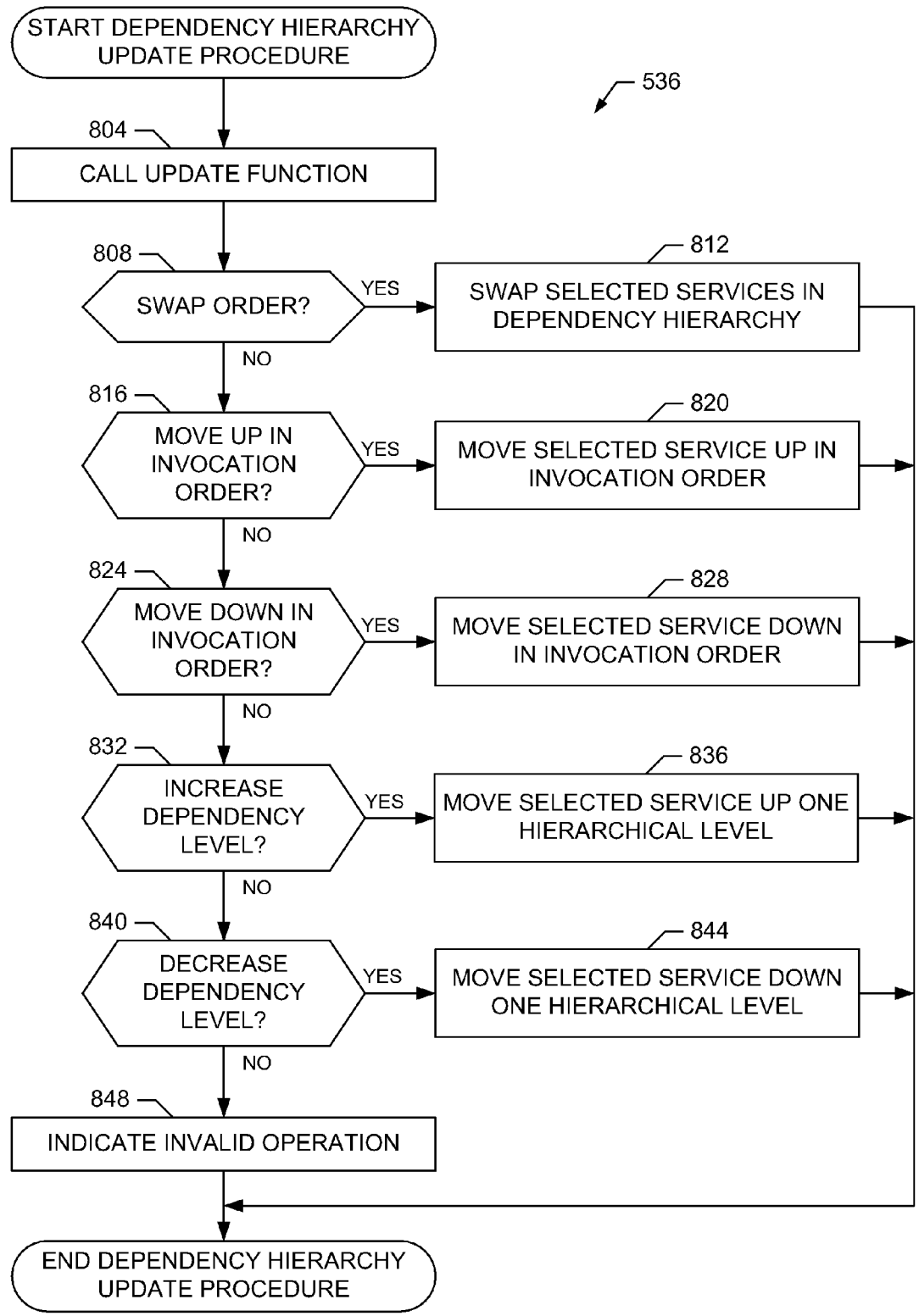
FIG. 8 illustrates a flowchart representative of example machine readable instructions to perform an update dependency hierarchy configuration procedure that may be used to implement the example machine readable instructions of FIG. 5 and/or executed to implement the example dependency configuration unit of FIGS. 2 and/or 3.

Next, after processing at block 528 completes, or if the input information does not indicate that new child service(s) are to be added to the example hierarchical dependency tree (block 524), control proceeds to block 532 at which the example dependency configuration unit 210 determines whether the input information indicates that one or more services already existing in the example hierarchical dependency tree are to be updated. In other words, at block 532 the example dependency configuration unit 210 determines whether the current hierarchical dependency tree is to be updated. If the current dependency configuration unit 210 is to be updated (block 532), control proceeds to block 536 at which the example dependency configuration unit 210 performs a configuration procedure to update services already existing in the current hierarchical dependency tree. Example machine readable instructions to implement the processing at block 536 are illustrated in FIG. 8 and discussed in greater detail below.

Then, after processing at block 536 completes, or if the input information does not indicate that the current hierarchical dependency tree is to be updated (block 532), control proceeds to block 540 at which the example dependency configuration unit 210 determines whether the input information indicates that the additions and/or updates to the example hierarchical dependency tree have been approved by the authenticated user. If the hierarchical dependency tree configuration has not been approved (block 540), control proceeds to block 544 at which the example dependency configuration unit 210 clears any additions and/or updates that had been performed to the example hierarchical dependency tree. Control then returns to block 512 and blocks subsequent thereto at which the example dependency configuration unit 210 presents the restored hierarchical dependency tree configuration and awaits configuration information to be input by the user. If, however, the authenticated user indicates that further updates to the example hierarchical dependency tree are to be made (block 540), control returns to block 516 and blocks subsequent thereto.

However, if the hierarchical dependency tree configuration has been approved by the user (block 540), control proceeds to block 548 at which the example dependency configuration unit 210 stores the updated hierarchical dependency tree specifying the newly created and/or updated service hierarchy. Control then proceeds to block 552 at which the example dependency configuration unit 210 determines whether the user has completed configuring the hierarchical dependency tree. If user configuration is not done (block 552), control returns to block 512 and blocks subsequent thereto. Otherwise, execution of the example machine readable instructions 500 then ends.

Example machine readable instructions 520 to perform an example configuration procedure to add new root service(s) to a hierarchical dependency tree are represented by the flowchart shown in FIG. 6. The example machine readable instructions 520 may be used to implement the processing performed at block 520 of FIG. 5 and/or executed to implement the example dependency configuration unit 210 included in the example SMU 200 of FIG. 2. In the illustrated example, services to be included in the example hierarchical dependency tree are assumed to have one-to-one correspondences with nodes of the hierarchical dependency tree. Therefore, in the illustrated example, each new root service corresponds to a respective new root node to be added to the hierarchical dependency tree. As such, the terms "service" and "node" are used interchangeably in the description of FIG. 6 unless otherwise noted. However, the example machine readable instructions 520 illustrated in FIG. 6 may be readily adapted to support implementations in which multiple services may be associated with a single node in the hierarchical dependency tree.

Turning to FIG. 6, the example machine readable instructions 520 begin execution at block 604 at which the example dependency configuration unit 210 obtains the service(s) that have been selected by an authenticated user for addition to the example hierarchical dependency tree as root service(s) to be added to corresponding root node(s)). For example, the user may select the service(s) and corresponding node(s) obtained at block 604 by checking entries in a list presented by the example GUI 330 containing some or all of the services included in the example distributed computing environment 100. Then, control proceeds to block 608 at which the example dependency configuration unit 210 invokes the example dependency tracker unit 310 to process each selected service to be added as a root service to a corresponding root node in the example hierarchical dependency tree.

For each selected new root service, control next proceeds to block 612 at which the example service timer configuration unit 320 included in the example dependency configuration unit 210 creates a new instance of a service timer to be associated with a corresponding current new root node. At block 612, the created service timer is configured to track the time block to which the current new root node is to be assigned and, for example, is configured to assert a signal, interrupt, etc., indicating when the specified time block occurs. Next, control proceeds to block 616 at which the example service timer configuration unit 320 adds the current new root node to a time block specified by the authenticated user. As such, the time block to which the current new root node is assigned is part of a time dependent schedule indicating when a service manipulation operation associated with the new root service is to be invoked.

Next, control proceeds to block 620 at which the example service operation configuration unit 325 included in the example dependency configuration unit 210 associates a service manipulation operation specified by the authenticated user with the current new root service. As discussed above, examples of service manipulation operations include (1) a stop operation to be invoked to stop execution of the new root service, (2) a start operation to be invoked to start execution of the new root service, (3) a disable operation to be invoked to disable the new root service from receiving and responding to service requests while allowing the new root service to continue executing, (4) an enable operation to be invoked to enable the new root service to received and respond to service requests, etc.

Next, control proceeds to block 624 at which the example dependency configuration unit 210 determines whether all of the selected new root services have been processed. If all the selected services have not been processed, control returns to block 608 and blocks subsequent thereto at which the example dependency configuration unit 210 invokes the example dependency tracker unit 310 to process the next selected service to be added as a root service to a corresponding root node in the example hierarchical dependency tree. However, if all the selected services have been processed, execution of the example machine readable instructions 520 ends.

Example machine readable instructions 528 to perform an example configuration procedure to add new child service(s) to a hierarchical dependency tree are represented by the flowchart shown in FIG. 7. The example machine readable instructions 528 may be used to implement the processing performed at block 528 of FIG. 5 and/or executed to implement the example dependency configuration unit 210 included in the example SMU 200 of FIG. 2. In the illustrated example, services to be included in the example hierarchical dependency tree are assumed to have one-to-one correspondences with nodes of the hierarchical dependency tree. Therefore, in the illustrated example, each new child service corresponds to a respective new child node to be added to the hierarchical dependency tree. As such, the terms "service" and "node" are used interchangeably in the description of FIG. 7 unless otherwise noted. However, the example machine readable instructions 528 illustrated in FIG. 7 may be readily adapted to support implementations in which multiple services may be associated with a single node in the hierarchical dependency tree.

Turning to FIG. 7, the example machine readable instructions 528 begin execution at block 704 at which the example dependency configuration unit 210 obtains the service(s) that have been selected by an authenticated user for addition to the example hierarchical dependency tree as child service(s) to be added to corresponding child node(s). For example, the user may select the service(s) and corresponding node(s) obtained at block 704 by checking entries in a list presented by the example GUI 330 containing some or all of the services included in the example distributed computing environment 100. Then, control proceeds to block 708 at which the example dependency configuration unit 210 obtains a service/node already existing in the example hierarchical dependency tree that has been selected by the authenticated user to be a parent of the selected child node(s). For example, the user may select the node/service obtained at block 708 by selecting a particular root or child node and/or root or child service in the example hierarchical dependency tree structure presented by the example GUI 330.

Next, control proceeds to block 712 at which the example service timer configuration unit 320 included in the example dependency configuration unit 210 associates each selected child node obtained at block 704 with the time block and service timer already associated with the selected parent node obtained at block 708. In another example implementation, at block 712 the example service timer configuration unit 320 may associate each selected child node with any specified time block, but still associate each selected child node with the service timer already corresponding to the selected parent node. Control next proceeds to block 716 at which the example service hierarchy configuration unit 315 included in the example dependency configuration unit 210 configures each selected child service/node obtained at block 704 to have a hierarchical dependency level one greater than the selected parent service/node obtained at block 708. In this way, the dependency level configuration at block 716 combined with the association at block 712 of the selected child service(s)/node(s) with the service timer already associated with the selected parent node establishes a dependency relationship between each selected child service/node and the selected parent service/node.

Next, control proceeds to block 720 at which the example service hierarchy configuration unit 315 configures an invocation order for service manipulation operation(s) associated with the selected child service(s). For example, the invocation order may default to be the order in which multiple services are selected by the authenticated user to be added as child services to corresponding node(s) to the example hierarchical dependency tree. Additionally, the example service hierarchy configuration unit 315 may be configured to allow an invocation order being specified by the user. As discussed above, the invocation order specified at block 720 allows service manipulation operations for multiple child services to be invoked in a particular order even though no dependency relationship(s) exist between the child services.

Next, control proceeds to block 724 at which the example service operation configuration unit 325 included in the example dependency configuration unit 210 associates a service manipulation operation specified by the authenticated user with each selected child service obtained at block 704. As discussed above, examples of service manipulation operations include (1) a stop operation to be invoked to stop execution of the selected child service, (2) a start operation to be invoked to start execution of the selected child service, (3) a disable operation to be invoked to disable the new selected child service from receiving and responding to service requests while allowing the selected child service to continue executing, (4) an enable operation to be invoked to enable the selected child service to receive and respond to service requests, etc. Then, after processing at block 724 completes, execution of the example machine readable instructions 528 then ends.

Example machine readable instructions 536 to perform an example configuration procedure to update a current hierarchical dependency tree are represented by the flowchart shown in FIG. 8. The example machine readable instructions 536 may be used to implement the processing performed at block 536 of FIG. 5 and/or executed to implement the example dependency configuration unit 210 included in the example SMU 200 of FIG. 2. In the illustrated example, services included in the example hierarchical dependency tree are assumed to have one-to-one correspondences with nodes of the hierarchical dependency tree. As such, the terms "service" and "node" are used interchangeably in the description of FIG. 8 unless otherwise noted. However, the example machine readable instructions 536 illustrated in FIG. 8 may be readily adapted to support implementations in which multiple services may be associated with a single node in the hierarchical dependency tree.

Turning to FIG. 8, the example machine readable instructions 536 begin execution at block 804 at which the example dependency configuration unit 210 obtains a configuration update command input by an authenticated user. For example, to input a particular configuration update command, the user may select an appropriate update icon, menu option, etc., presented via the example GUI 330.

Figure 23:
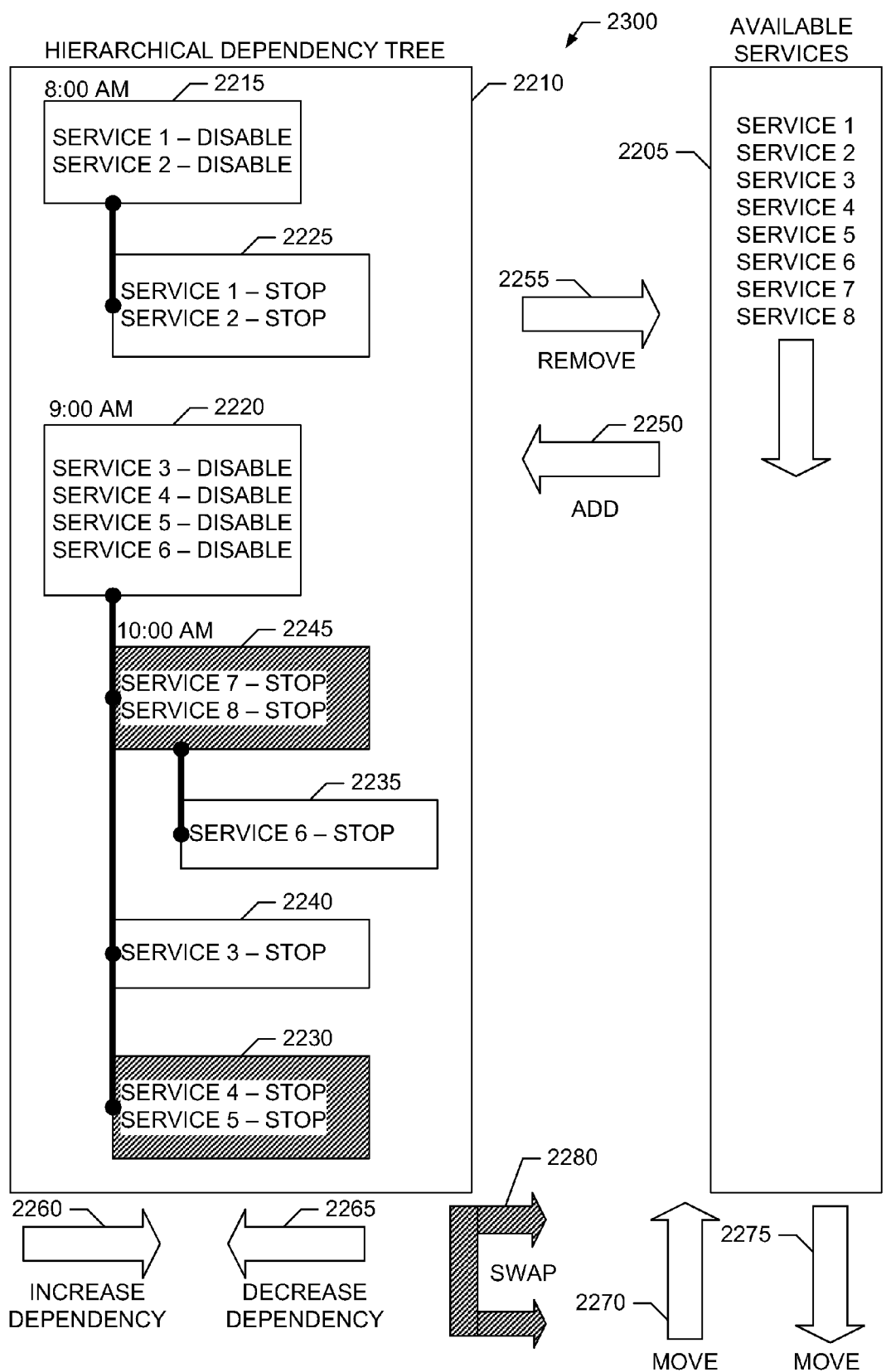
FIGS. 23-26 illustrate example operations that may be performed by the example GUI of FIG. 22.

Next, at block 808 the example service hierarchy configuration unit 315 included in the example dependency configuration unit 210 determines whether the update command obtained at block 804 corresponds to a command to swap the order to two selected services/nodes. If the update command corresponds to a swap order command (block 808), control proceeds to block 812 at which the example service hierarchy configuration unit 315 swaps a selected pair of services/nodes in the example hierarchical dependency tree. For example, at block 812 the authenticated user may select any pair of root services/nodes, child services/nodes or combination of a root service/node and a child service/node in the example hierarchical dependency tree structure presented by the example GUI 330. As an illustrative example, FIG. 23 illustrates an example operation 2300 of the example GUI 2200 of FIG. 22 in which the example swap utility 2280 is selected, thereby causing the selected example child nodes 2230 and 2245 to be swapped as shown. After processing at block 812 completes, execution of the example machine readable instructions ends.

If, however, the update command does not correspond to a swap order command (block 808), control proceeds to block 816 at which the example service hierarchy configuration unit 315 determines whether the update command obtained at block 804 corresponds to a command to move a service/node up in invocation order. If the update command corresponds to a move up in invocation order command (block 816), control proceeds to block 820 at which the example service hierarchy configuration unit 315 adjusts the invocation order of the selected service/node up. For example, if the selected service/node is a root service/node, at block 820 the example service hierarchy configuration unit 315 adjusts the invocation order of the selected root service/node to be one position earlier relative to other root services/nodes associated with the same time block. If the selected service/node is a child service/node, at block 820 the example service hierarchy configuration unit 315 adjusts the invocation order of the selected child service/node to be one position earlier relative to other child services/nodes depending from the same parent service/node. After processing at block 820 completes, execution of the example machine readable instructions ends.

Figure 24:
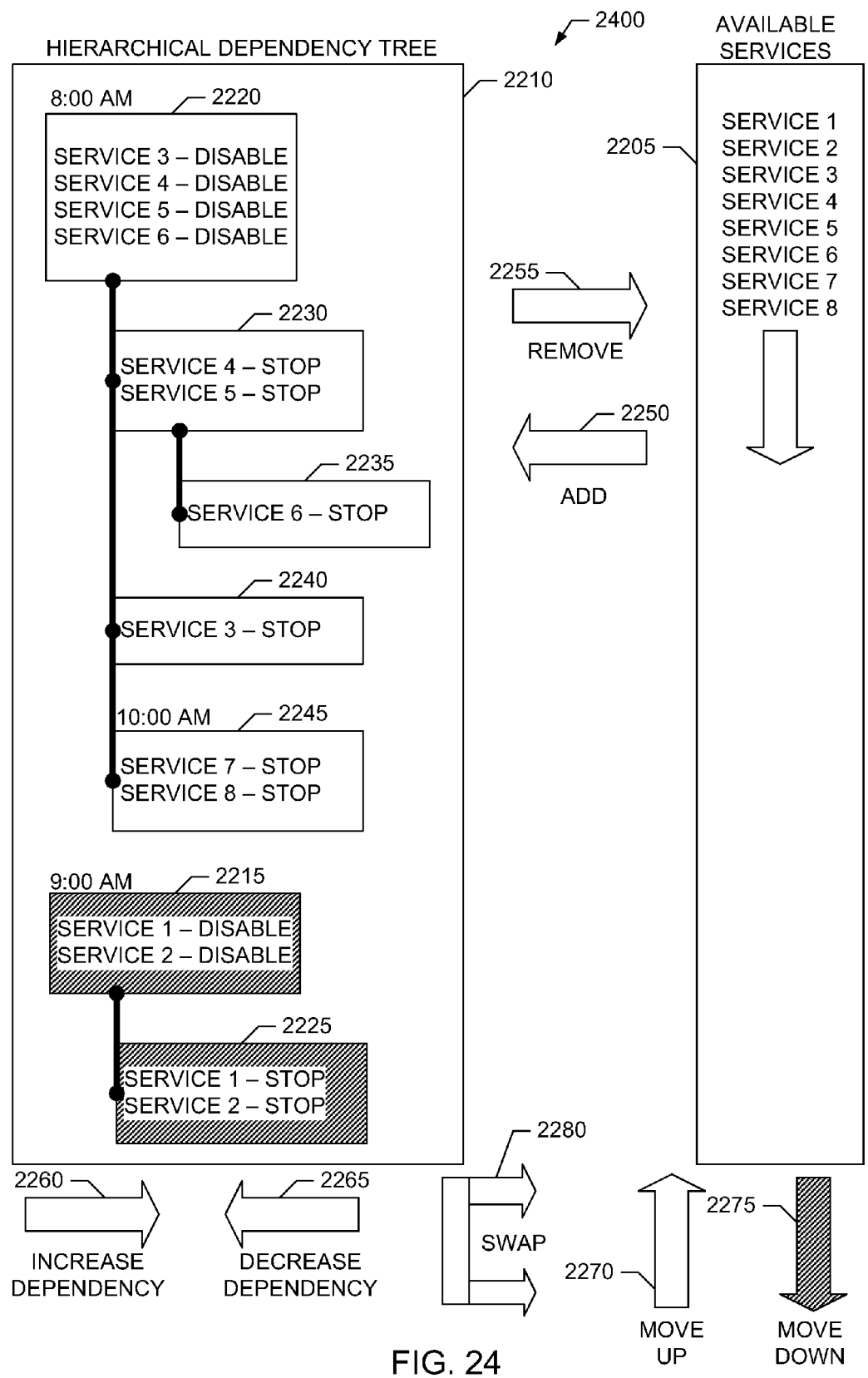

If, however, the update command does not correspond to a move up in invocation order command (block 816), control proceeds to block 824 at which the example service hierarchy configuration unit 315 determines whether the update command obtained at block 804 corresponds to a command to move a service/node down in invocation order. If the update command corresponds to a move down in invocation order command (block 824), control proceeds to block 828 at which the example service hierarchy configuration unit 315 adjusts the invocation order of the selected service/node down. For example, if the selected service/node is a root service in a corresponding root node, at block 828 the example service hierarchy configuration unit 315 adjusts the invocation order of the selected root service to be one position later relative to other root services associated with the same root node and, thus, same time block. If, however, the selected node is an entire root node, at block 828 the example service hierarchy configuration unit 315 moves the selected root node down in the hierarchy and associates the selected root node with the time block of the root node below it in the hierarchy. The example service hierarchy configuration unit 315 then moves this other root node up in the hierarchy and associates it with the time block previously associated with the selected root node. As an illustrative example, FIG. 24 illustrates an example operation 2400 of the example GUI 2200 of FIG. 22 in which the example move down utility 2275 is selected, thereby causing the selected example root node 2215 (along with its associated child node 2225) to be moved down below the example root node 2220. If the selected service/node is a child service/node, at block 828 the example service hierarchy configuration unit 315 adjusts the invocation order of the selected child service/node to be one position later relative to other child services/nodes depending from the same parent service/node. After processing at block 828 completes, execution of the example machine readable instructions ends.

Figure 25:
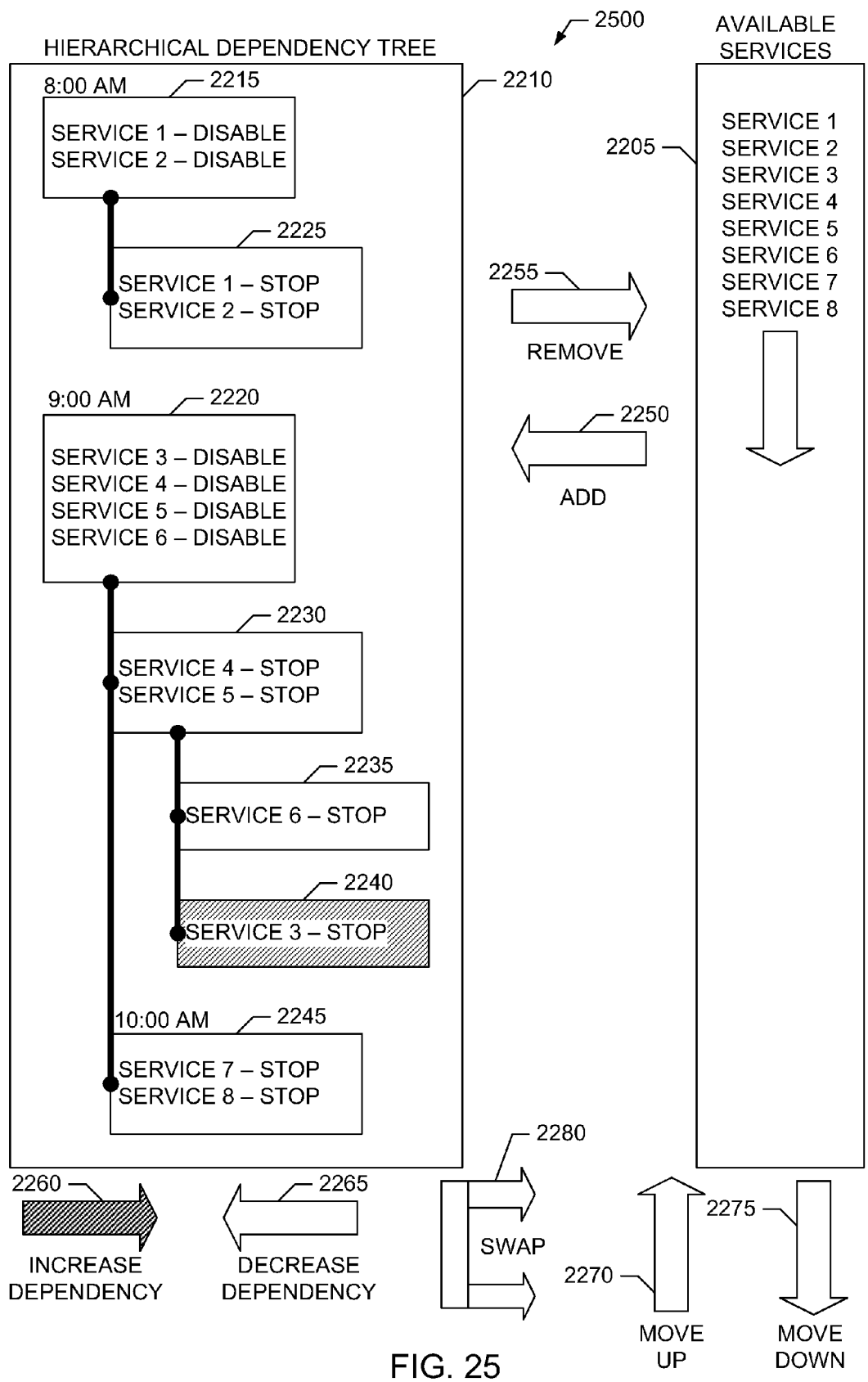

If, however, the update command does not correspond to a move down in invocation order command (block 824), control proceeds to block 832 at which the example service hierarchy configuration unit 315 determines whether the update command obtained at block 804 corresponds to a command to increase the dependency level associated with a selected service/node. If the update command corresponds to an increase dependency level command (block 832), control proceeds to block 836 at which the example service hierarchy configuration unit 315 increases the dependency level of the selected service/node by one level in the hierarchy such that the selected service/node is updated (or repositioned) to be a child service/node dependent on another service/node. For example, at block 836 the example service hierarchy configuration unit 315 may increase the dependency level of the selected service/node and then reconfigure the selected service/node to depend from another service/node located at the previous dependency level of the selected service/node. In an example implementation, if a single service in a selected node having multiple services is selected, the example service hierarchy configuration unit 315 will cause the selected service to become dependent on its previously assigned node. If another node already exists that is dependent on the selected service's previously assigned node, the selected service will be assigned to that other node. If no such node exists, the example service hierarchy configuration unit 315 will create a new node that is dependent on the selected service's previously assigned node and assign the selected service to it. However, if an entire node is selected, the example service hierarchy configuration unit 315 will make the node above it in the hierarchy the new parent node of the selected node. As an illustrative example, FIG. 25 illustrates an example operation 2500 of the example GUI 2200 of FIG. 22 in which the example increase dependency utility 2260 is selected, thereby causing the selected example child node 2240 to be made dependent upon the example child node 2230. After processing at block 836 completes, execution of the example machine readable instructions ends.

Figure 26:
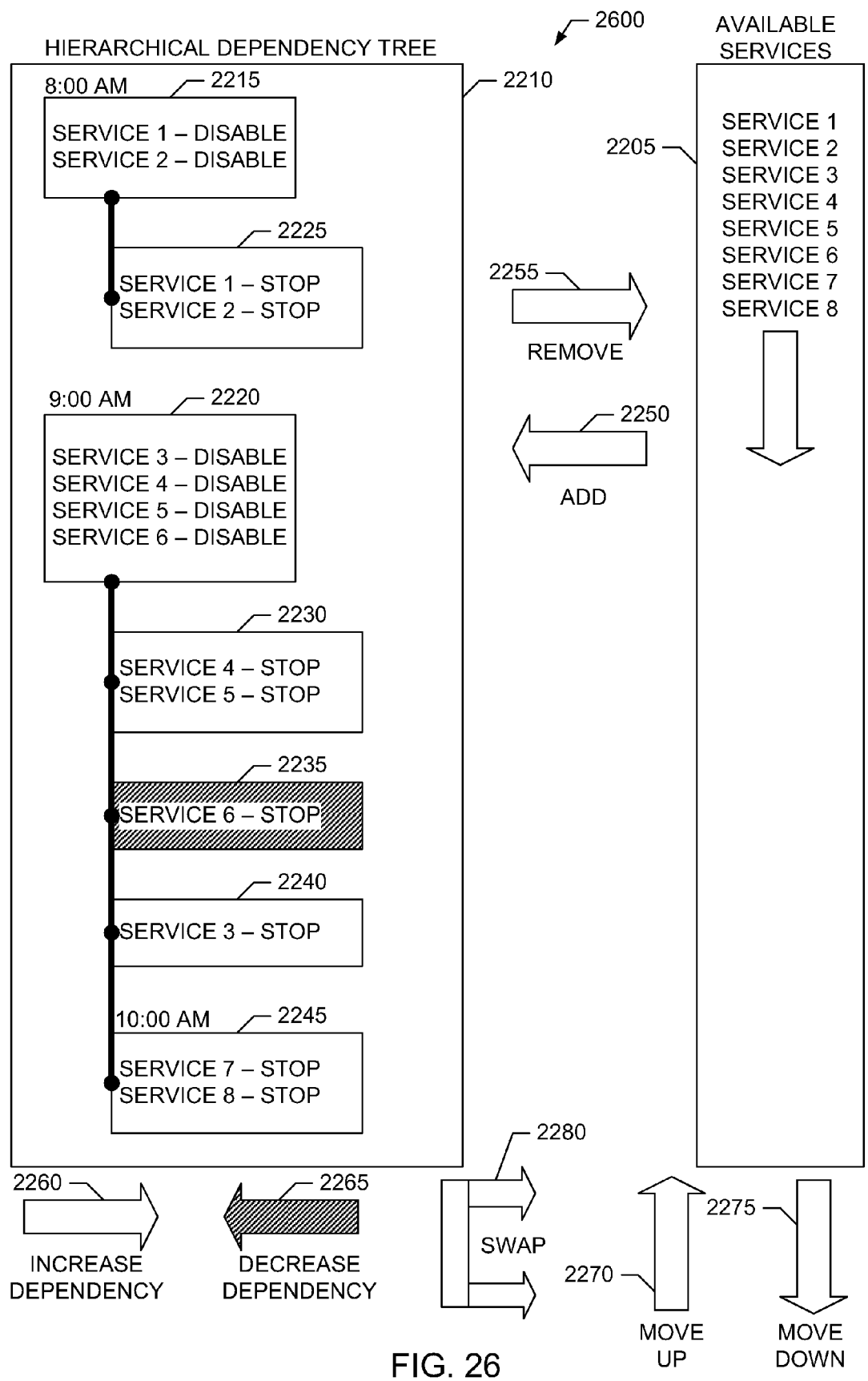

If, however, the update command does not correspond to an increase dependency level command (block 832), control proceeds to block 840 at which the example service hierarchy configuration unit 315 determines whether the update command obtained at block 804 corresponds to a command to decrease the dependency level associated with a selected service/node. If the update command corresponds to a decrease dependency level command (block 840), control proceeds to block 844 at which the example service hierarchy configuration unit 315 decreases the dependency level of the selected service/node by one level in the hierarchy such that the selected service/node is updated (or repositioned) to remove a dependency relationship associated with the selected child service/node. For example, at block 840 the example service hierarchy configuration unit 315 may decrease the dependency level of the selected service/node and then reconfigure the selected service/node to (1) depend from the parent service/node of the previous parent service/node of the selected service/node, or (2) be a root service/node if the updated dependency level associated with the selected service/node corresponds to the lowest dependency level. Furthermore, if an entire node is selected, all services assigned to the selected node move with the selected node when the example service hierarchy configuration unit 315 decreases the selected node's dependency level. However, if a service in a node is selected, the example service hierarchy configuration unit 315 reassigns the selected service to the parent node of the node previously assigned to the selected service. As an illustrative example, FIG. 26 illustrates an example operation 2600 of the example GUI 2200 of FIG. 22 in which the example decrease dependency utility 2265 is selected, thereby causing the selected example child node 2235 to be made dependent upon the example root node 2220. After processing at block 844 completes, execution of the example machine readable instructions ends.

However, if the update command does not correspond to a decrease dependency level command (block 840), control proceeds to block 848 at which the example service hierarchy configuration unit 315 indicates that an invalid command was obtained at block 804. After performing any appropriate error processing at block 848, execution of the example machine readable instructions ends.

As will be readily appreciated, the example machine readable instructions represented by the flowcharts of FIGS. 5-8 may be used to specify multiple instances of the same service in the example hierarchical dependency tree maintained by the example dependency configuration unit 210. For example, multiple instances of the same service may be specified when different service manipulation operations are to be performed on the same service at different times and/or based on different dependency relationships. As an illustrative example, which is in no way meant to be limiting, a first instance of a first service may be included in the example hierarchical dependency tree to specify that the first service is to be stopped at a first time. In such an example, a second instance of the same first service may be included in the example hierarchical dependency tree to specify that the first service is to be started at a second later time. Similarly, a first instance of a second service may be included in the example hierarchical dependency tree to specify that the second service is to be disabled at a third time. In such an example, a second instance of the same second service may be included in the example hierarchical dependency tree to specify that the second service is to be enabled at a fourth later time.

Figure 9A:
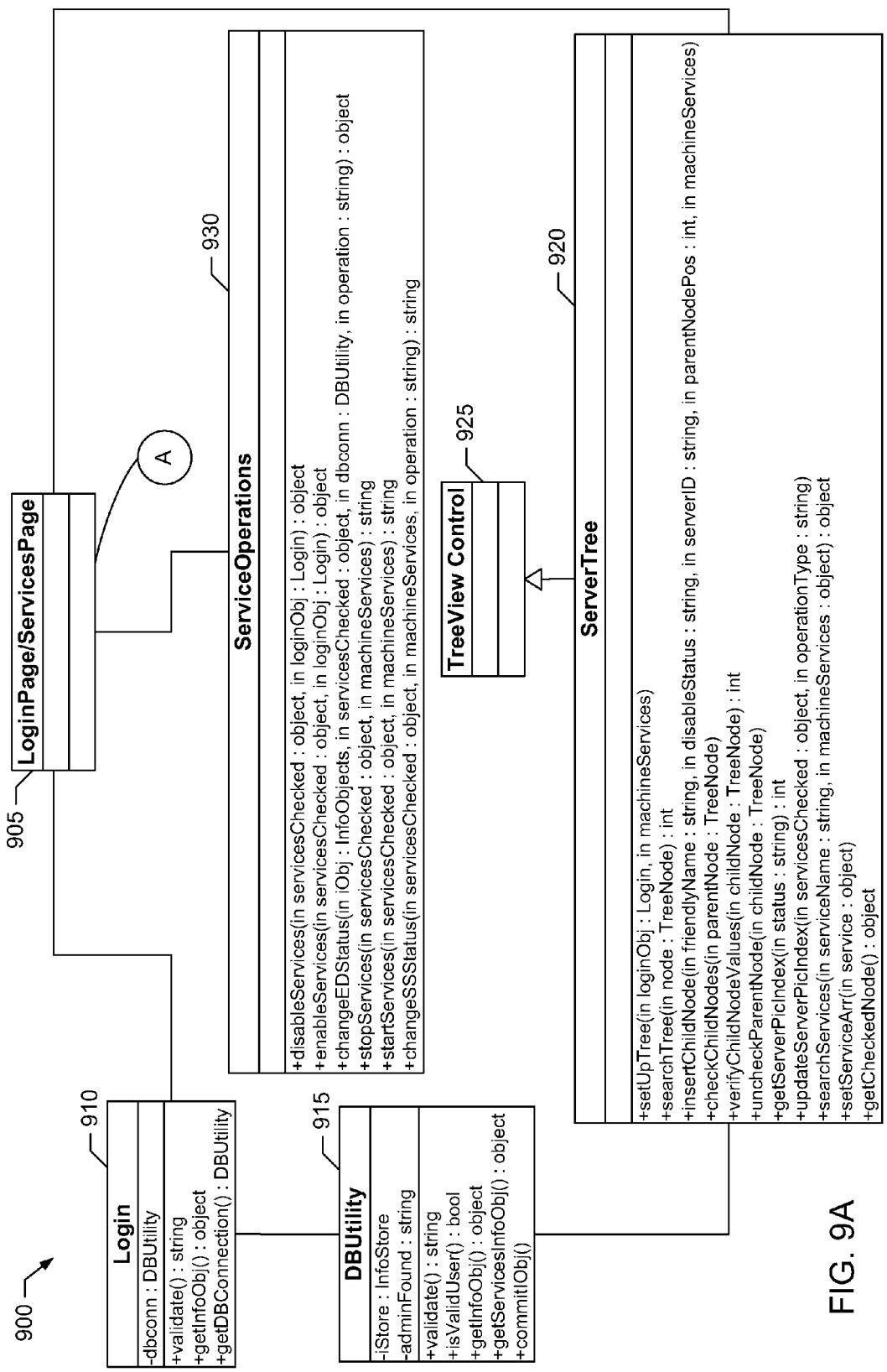
FIGS. 9A-9B collectively illustrate a static structure block diagram of an example object oriented implementation of the example dependency configuration unit of FIGS. 2 and/or 3.
Figure 9B:
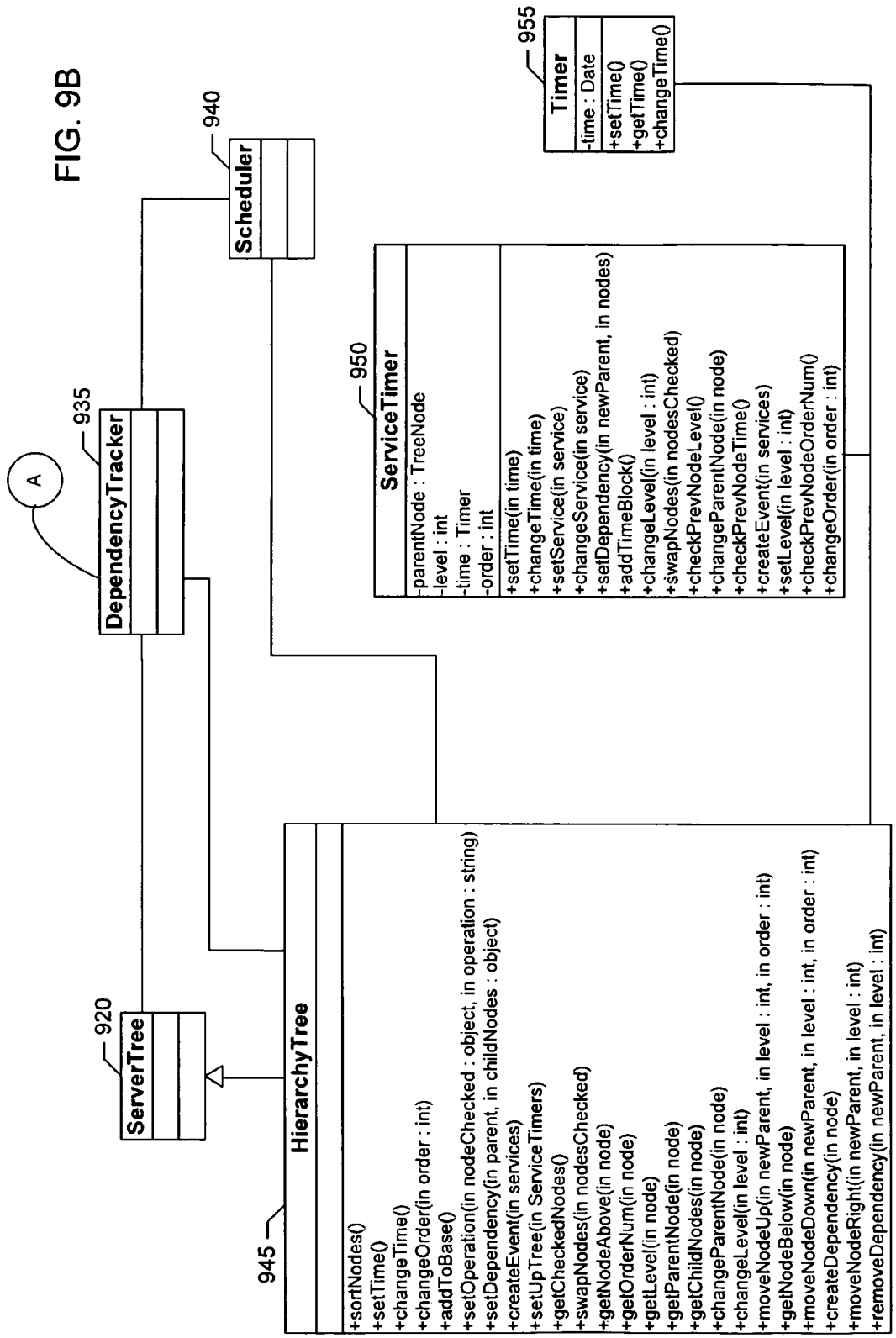

An example static structure block diagram representative of an example object oriented implementation 900 of the example dependency configuration unit 210 is illustrated in FIGS. 9A-9B. In the illustrated example, the object oriented implementation 900 of the example dependency configuration unit 210 is based on the C# programming language. However, the example object oriented implementation 900 of the example dependency configuration unit 210 may be readily adapted for implementation using any other object oriented programming language, such as JAVA™.

Turning to FIG. 9A, the example object oriented implementation 900 of the example dependency configuration unit 210 includes a login page and service page class 905 to provide a thick client interface for a user to access the example dependency configuration unit 210. The example login page and service page class 905 accesses a login class 910 and a database utility class 915 implementing, for example, utilities included in the example support unit 335 of the example dependency configuration unit 210. The example login class 910 and the example database class 915 provide interfaces by which the user may be authenticated, or validated, to access the example dependency configuration unit 210 and, in particular, the example hierarchical dependency tree structure maintained by the example dependency configuration unit 210.

For example, the database utility class 915 provides access to a server tree class 920 implementing, for example, the service management unit 305 of the example dependency configuration unit 210. As illustrated in FIG. 9A, the example server tree class 920 includes a number of methods to maintain the example hierarchical dependency tree structure representing the dependency relationships between child nodes (or services) and parent nodes (or services). The example server tree class 920 also inherits a tree view control class 925, for example, to allow presentation of the hierarchical dependency tree structure via the example GUI 330 of the example dependency configuration unit 210.

In the illustrated example, the example login page and service page class 905 also accesses a service operations class 930 implementing, for example, the service operation configuration unit 325 of the example dependency configuration unit 210. As illustrated in FIG. 9A, the example service operations class 930 includes a number of methods to specify service manipulation operations to be invoked to manipulate the services included in the example hierarchical dependency tree structure maintained by the example server tree class 920.

Additionally, the example login page and service page class 905 also accesses a dependency tracker class 935 illustrated in FIG. 9B. The example dependency tracker class 935 implements, for example, the dependency tracker unit 310 of the example dependency configuration unit 210. As illustrated in FIG. 9B, the example dependency tracker class 935 accesses a scheduler class 940 and a hierarchy tree class 945 implementing, for example, the service hierarchy configuration unit 315 of the example dependency configuration unit 210. As further illustrated in FIG. 9B, the example hierarchy tree class 945 includes a number of methods to specify, update and remove dependency relationships between child nodes (or services) and parent nodes (or services) in the example hierarchical dependency tree. The example hierarchy tree class 945 also inherits from the example server tree class 920 to enable the specified, updated and/or removed dependency relationships to be represented in the example hierarchical dependency tree.

In the illustrated example, the hierarchy tree class 945 also accesses a service timer class 950 and a timer class 955 implementing, for example, the example service timer configuration 320 of the example dependency configuration unit 210. As illustrated in FIG. 9B, the example service timer class 950 and the example timer class 955 implement a number of methods to associate services with time blocks and to allow specification of a time dependent schedule for invocation of service manipulation operations.

Figure 10:
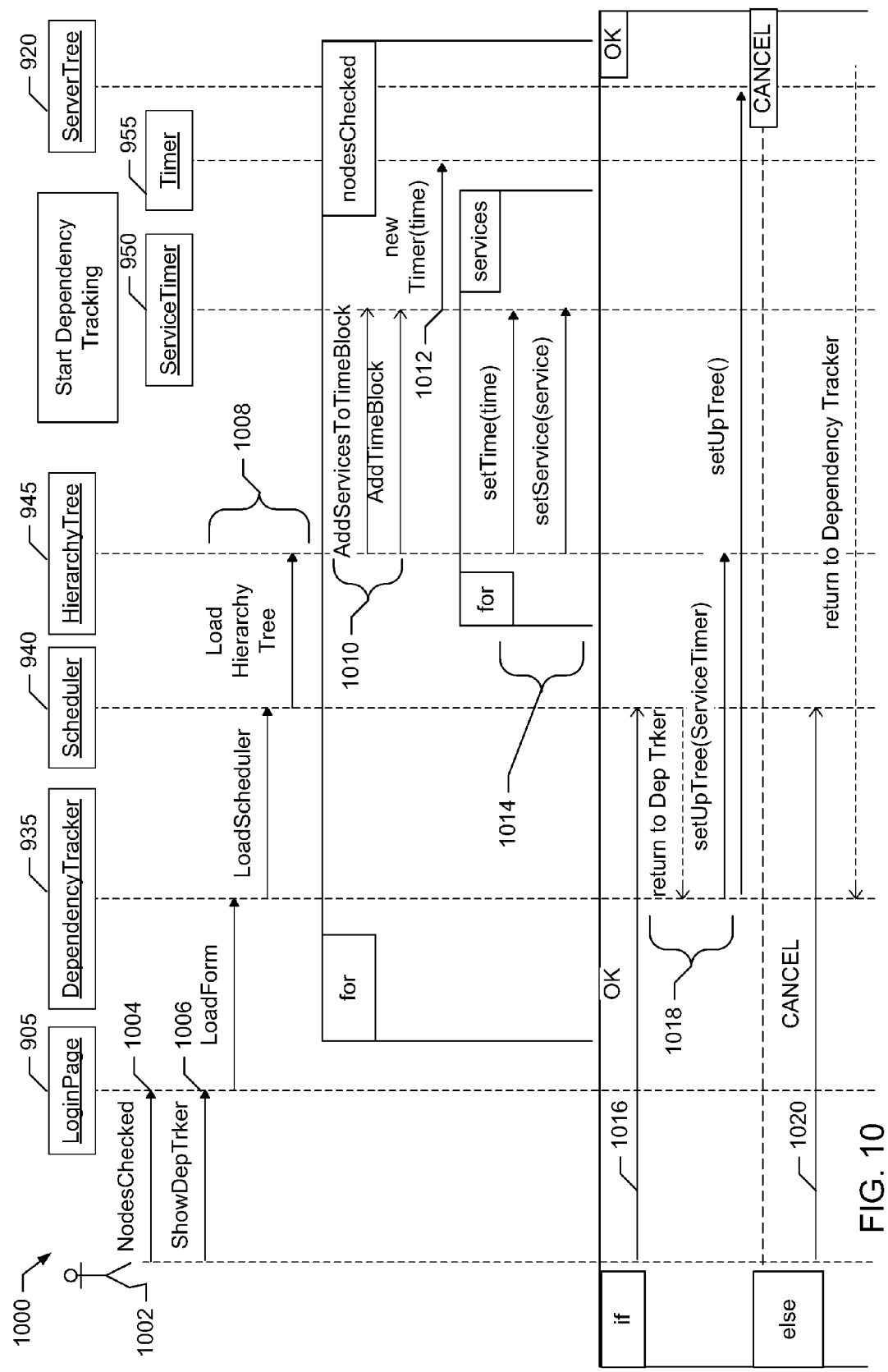
FIG. 10 illustrates a message sequence diagram representative of an example start dependency tracker procedure performed by the example object oriented implementation of FIGS. 9A-9B.

An example message sequence diagram 1000 to start service dependency tracking via the example object oriented implementation 900 of the example dependency configuration unit 210 is illustrated in FIG. 10. In the illustrated example of FIG. 10, an authenticated user 1002 uses the example GUI 330 of the example dependency configuration unit 210 to check nodes (or services) to be added as root nodes (or services) in the example hierarchical dependency tree. The example GUI 330 then begins the example message sequence diagram 1000 by initiating messages 1004 and 1006 to start dependency tracking or, in other words, start specifying service dependencies to be represented (or tracked) via the example hierarchical dependency tree. In response, the example login page and service page class 905, the example dependency tracker class 935, the example scheduler class 940 and the example hierarchy tree class 945 are used to initiate a set of messages 1008 to instantiate an existing hierarchical dependency tree structure, if one exists, to be presented to the authenticated user 1002 via, for example, the GUI 330.

Next, for each node (or service) checked by the authenticated user 1002, the example hierarchy tree class 945 is used to initiate a set of messages 1010 to associate the root node (or service) to a specified time block. A message 1012 then causes the service timer to create a timer instance to track the time block for the new root node (or service). If multiple services are to be associated with the same root node in the example hierarchical dependency tree, the example hierarchy tree class 945 is used to initiate a set of messages 1014 to associate these multiple services with the time block associated with the respective root node.

Next, if the authenticated user 1002 initiates an OK message 1016 indicating acceptance of the configuration of root nodes (or services), a set of messages 1018 causes the example hierarchical dependency tree to be setup and stored for subsequent processing. However, if the authenticated user 1002 initiates a CANCEL message 1020 indicating the configuration of root nodes (or services) is not accepted, the configuration is cancelled. The example message sequence diagram 1000 then ends.

Figure 11:
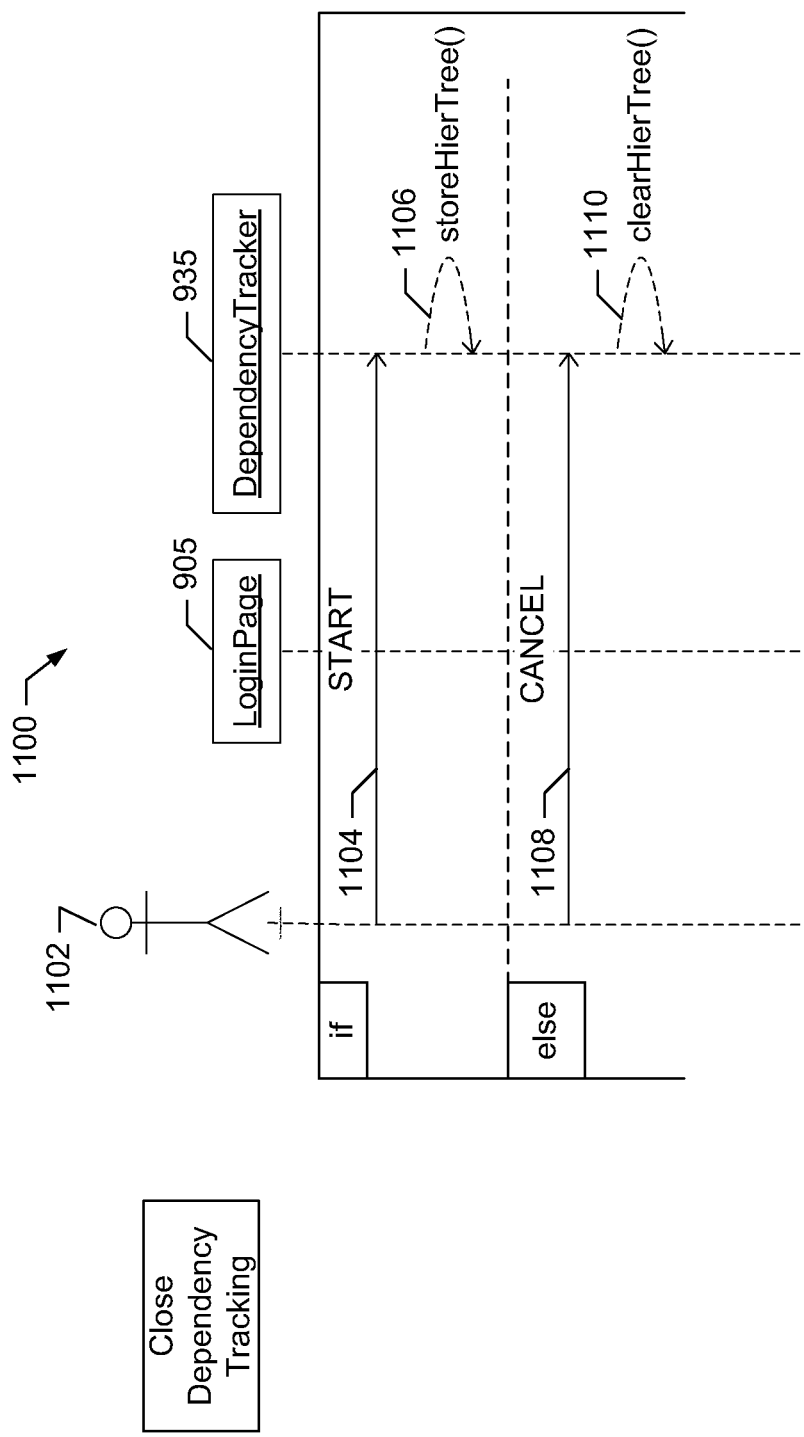
FIG. 11 illustrates a message sequence diagram representative of an example close dependency tracker procedure performed by the example object oriented implementation of FIGS. 9A-9B.

An example message sequence diagram 1100 to close service dependency tracking via the example object oriented implementation 900 of the example dependency configuration unit 210 is illustrated in FIG. 11. In the illustrated example of FIG. 11, an authenticated user 1102 uses the example GUI 330 of the example dependency configuration unit 210 to close dependency tracking configuration, thereby allowing the configured dependency relationship information to be used to condition invocation of service manipulation operations. In the example message sequence diagram 1100, if the authenticated user 1102 initiates a START message 1104 indicating that the configured dependency relationship information is ready to be used, a store message 1106 causes the currently configured hierarchical dependency tree to be stored for subsequent processing. However, if the authenticated user 1102 initiates a CANCEL message 1108 indicating that the configured dependency relationship information is not acceptable, a clear message 1110 causes the currently configured hierarchical dependency tree to be cleared. The example message sequence diagram 1100 then ends.

Figure 12:
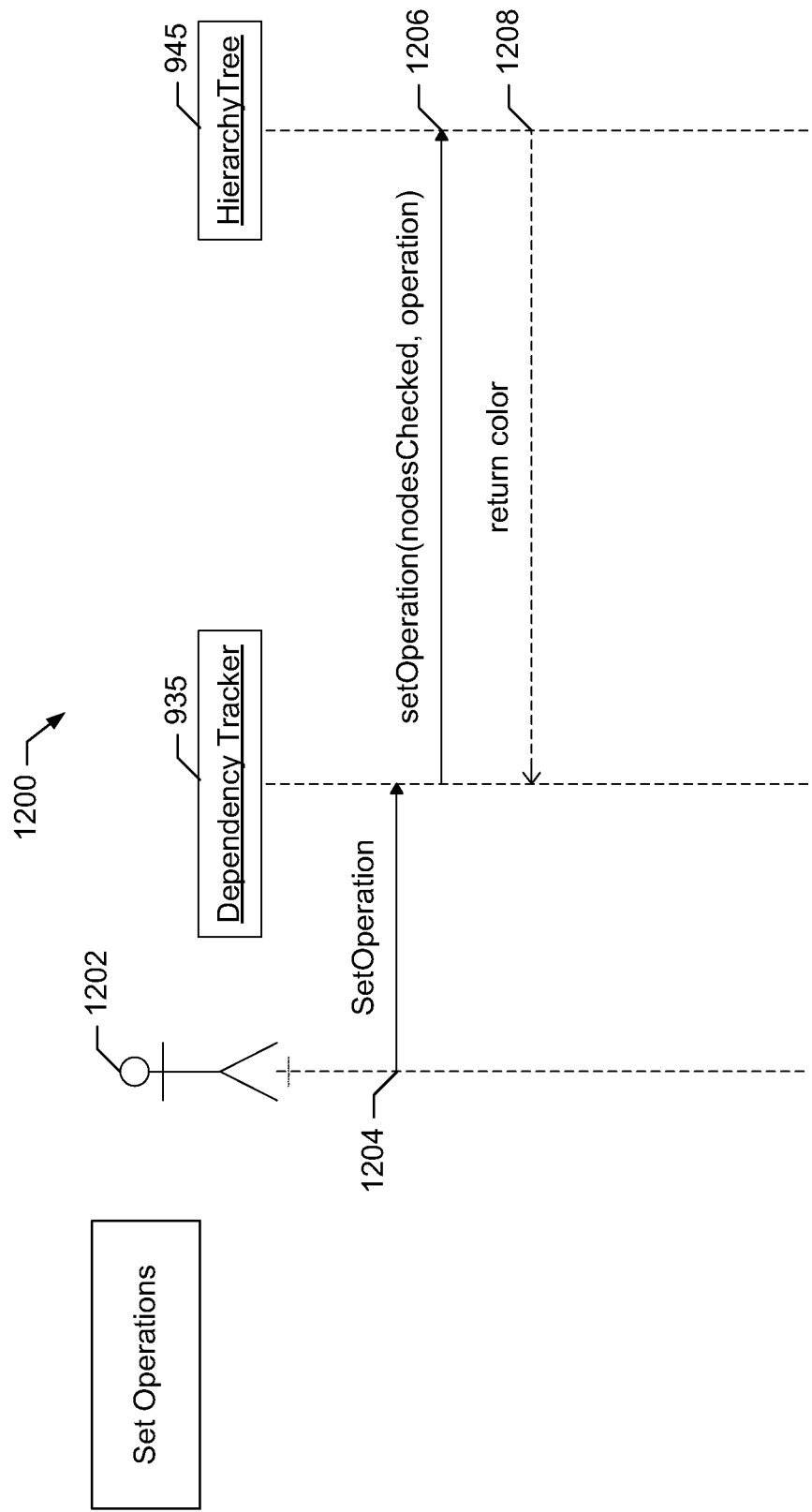
FIG. 12 illustrates a message sequence diagram representative of an example set operations procedure performed by the example object oriented implementation of FIGS. 9A-9B.

An example message sequence diagram 1200 to configure service manipulation operations via the example object oriented implementation 900 of the example dependency configuration unit 210 is illustrated in FIG. 12. In the illustrated example of FIG. 12, an authenticated user 1202 uses the example GUI 330 of the example dependency configuration unit 210 to specify service manipulation operations to be associated with the services included in the hierarchical dependency tree. In the example message sequence diagram 1200, the authenticated user 1202 initiates a set operation message 1204 specifying the service manipulation operation(s) to be associated with selected service(s) (or node(s)) in the hierarchical dependency tree. A subsequent message 1206 causes the specified service manipulation operation(s) to be stored and associated with the appropriate service(s) (or node(s)) in the hierarchical dependency tree. Then, a return message 1208 causes the newly specified service manipulation operations to be depicted as respective colors in the hierarchical dependency tree structure presented to the authenticated user 1202 via, for example, the GUI 330. For example, a first color may depict specified stop operations, a second color may depict specified start operations, a third color may depict specified disable operations, a fourth color may depict specified enable operations, etc. The example message sequence diagram 1200 then ends.

Figure 13:
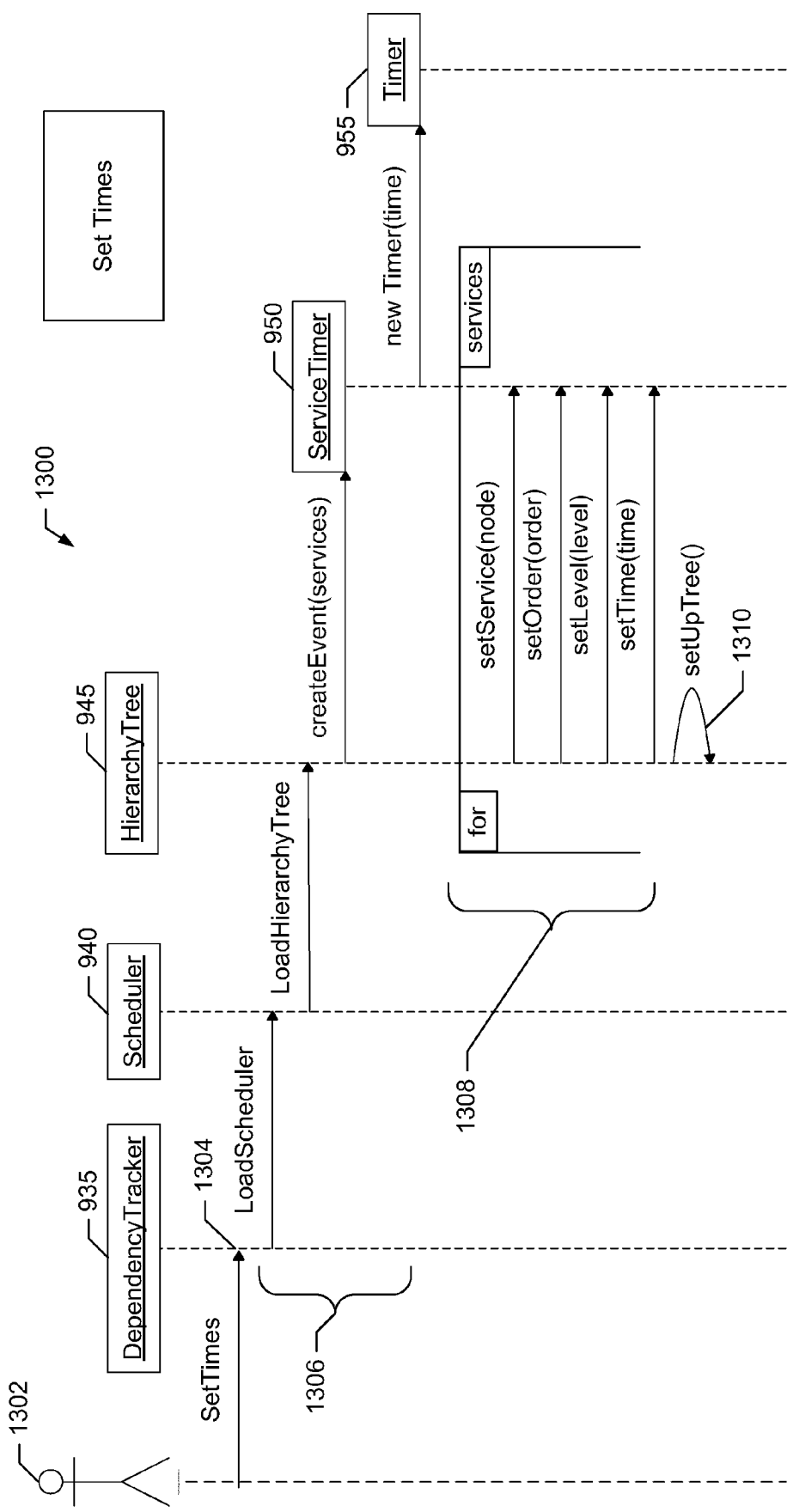
FIG. 13 illustrates a message sequence diagram representative of an example set times procedure performed by the example object oriented implementation of FIGS. 9A-9B.

An example message sequence diagram 1300 to configure invocation times via the example object oriented implementation 900 of the example dependency configuration unit 210 is illustrated in FIG. 13. In the illustrated example of FIG. 13, an authenticated user 1302 uses the example GUI 330 of the example dependency configuration unit 210 to specify a new time block to be associated with a selected node (or service) in the example hierarchical dependency tree. In the example message sequence diagram 1300, the authenticated user 1302 initiates a set times message 1304 specifying the new time block to be associated with the selected node (or service) in the hierarchical dependency tree. Although a child node can have a time block associated with it that is different from the time block of its parent node, if the selected node is a child node, the specified new time block cannot be earlier than the time block associated with the selected node's parent node.

A set of subsequent messages 1306 causes the selected node (or service) to be associated with the specified time block and a new timer instance to be created by the service timer to track the specified time block for the selected node (or service). For example, the set of messages 1308 update the time, invocation order and dependency level information for each service for inclusion in the new node. Next, a message 1310 causes the example hierarchical dependency tree to be setup and stored for subsequent processing. The example message sequence diagram 1300 then ends.

Figure 14:
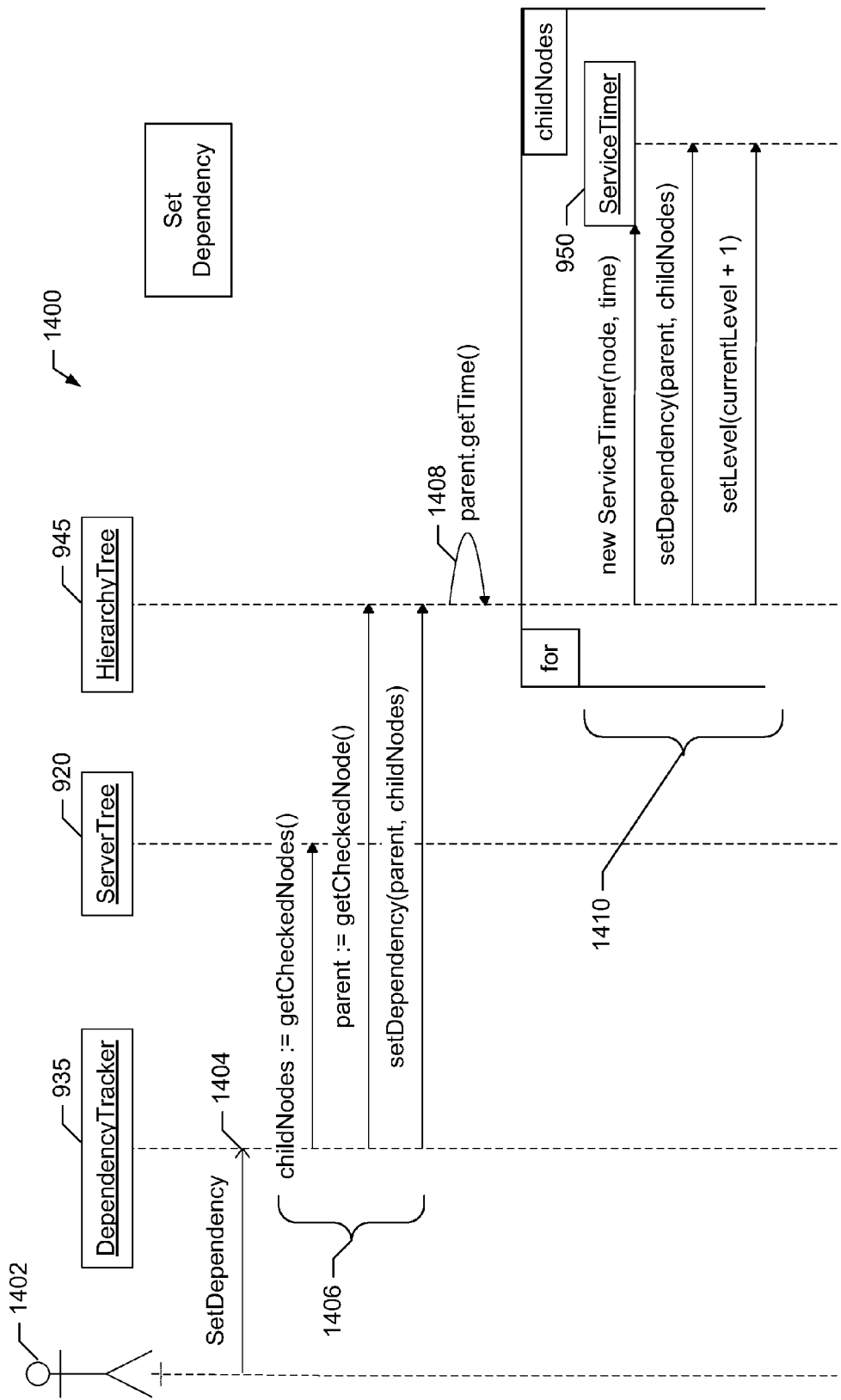
FIG. 14 illustrates a message sequence diagram representative of an example set dependency procedure performed by the example object oriented implementation of FIGS. 9A-9B.

An example message sequence diagram 1400 to configure child dependencies via the example object oriented implementation 900 of the example dependency configuration unit 210 is illustrated in FIG. 14. In the illustrated example of FIG. 14, an authenticated user 1402 uses the example GUI 330 of the example dependency configuration unit 210 to select a set of nodes (or services) to be dependent on a selected parent node (service) in the example hierarchical dependency tree. In the example message sequence diagram 1400, the authenticated user 1402 initiates a set dependency message 1404 indicating that a selected set of nodes (or services) is to be made dependent on a selected parent node (service). Next, a set of messages 1406 identifies the one or more selected nodes (or services) and the parent node selected by the authenticated user 1402 and indicates that a dependency relationship exists between these nodes.

Next, to associate the selected set of nodes/services to the time block of the selected parent node/service, a message 1408 is used to get the parent's time block. Then, for each selected node/service, a set of messages 1410 associates the node/service with the parent's time block. Additionally, the set of messages 1410 sets the dependency level of the node/service to be one greater than the dependency level of the parent, thereby indicating the parent-child dependency relationship. The example message sequence diagram 1400 then ends.

Figure 15:
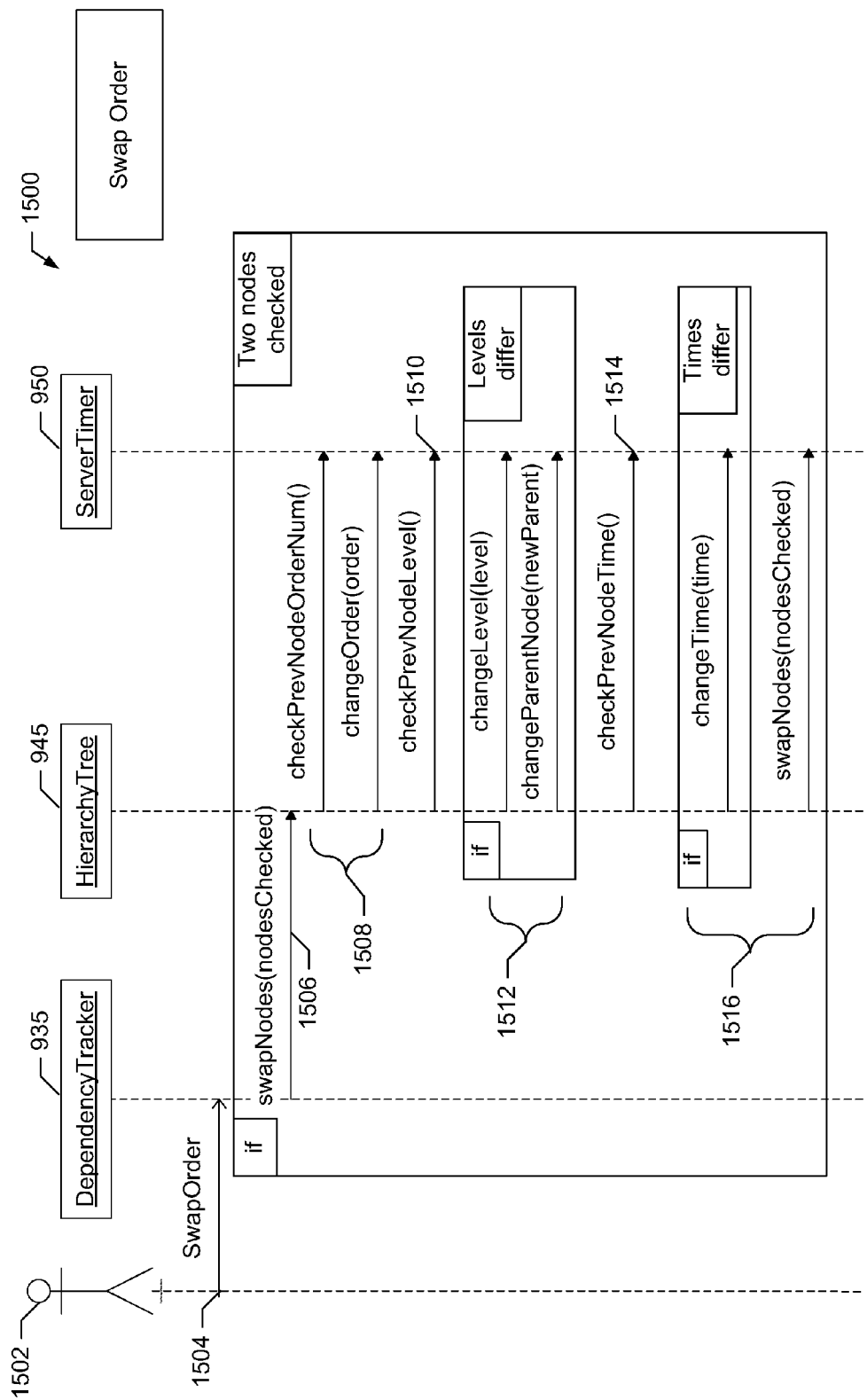
FIG. 15 illustrates a message sequence diagram representative of an example swap order procedure performed by the example object oriented implementation of FIGS. 9A-9B.

An example message sequence diagram 1500 to swap hierarchical dependency tree nodes via the example object oriented implementation 900 of the example dependency configuration unit 210 is illustrated in FIG. 15. In the illustrated example of FIG. 15, an authenticated user 1502 uses the example GUI 330 of the example dependency configuration unit 210 to select a pair of nodes to be swapped in the example hierarchical dependency tree. In the example message sequence diagram 1500, the authenticated user 1502 initiates a swap order message 1504 indicating that a selected pair of nodes is to be swapped in the example hierarchical dependency tree. Next, a message 1506 is used to verify that only two nodes have been selected by the authenticated user 1502.

Assuming that only two nodes have been selected, a set of messages 1508 are used to swap the invocation orders associated with the selected nodes. Next, a message 1510 checks the dependency levels of the two selected nodes. If the dependency levels differ and, thus, the two nodes had different parents, a set of messages 1512 updates the swapped nodes such that each node is now associated with the other's previous parent node. Next, a message 1514 checks the time blocks associated with the two selected nodes. If the time blocks differ, a set of messages 1516 updates the swapped nodes such that each node is now associated with the other's previous time block. The example message sequence diagram 1500 then ends.

Figure 16:
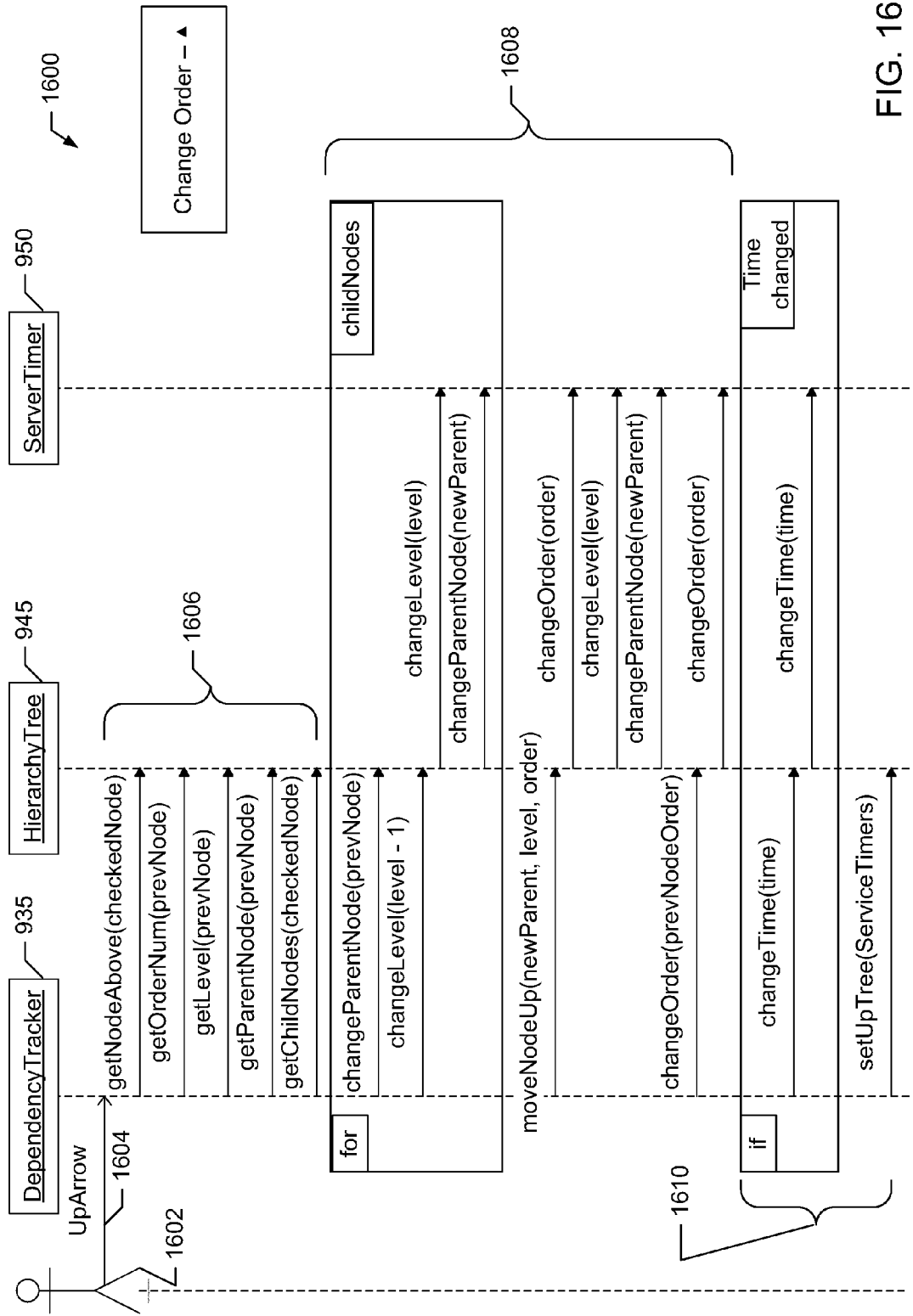
FIG. 16 illustrates a message sequence diagram representative of an example move order up procedure performed by the example object oriented implementation of FIGS. 9A-9B.

An example message sequence diagram 1600 to move up a selected hierarchical dependency tree node's invocation order via the example object oriented implementation 900 of the example dependency configuration unit 210 is illustrated in FIG. 16. In the illustrated example of FIG. 16, an authenticated user 1602 uses the example GUI 330 of the example dependency configuration unit 210 to select one or more nodes each having an invocation orders to be moved up (or, in other words, earlier) in the example hierarchical dependency tree. In the example message sequence diagram 1600, the authenticated user 1602 also uses the example GUI 330 to select an up-arrow icon to initiate an up arrow message 1604 indicating that the invocation order of each of the selected nodes is to be moved up in the example hierarchical dependency tree. Next, a set of messages 1606 is used to obtain the current parent-child dependency configuration associated with the selected nodes.

Then, using the obtained parent-child dependency configuration associated with each selected node, a set of messages 1608 moves the invocation order of each selected node up (earlier) in the example hierarchical dependency tree. Additionally, the set of messages 1608 updates any parent-child dependency relationships which are changed as a result of moving up the invocation order of a particular selected node. Next, a set of messages 1610 determines whether any changes to the parent-child dependency relationships require reassignment of a particular node to a new time block. The set of messages 1610 performs such time block reassignment, if necessary. The example message sequence diagram 1600 then ends.

Figure 17:
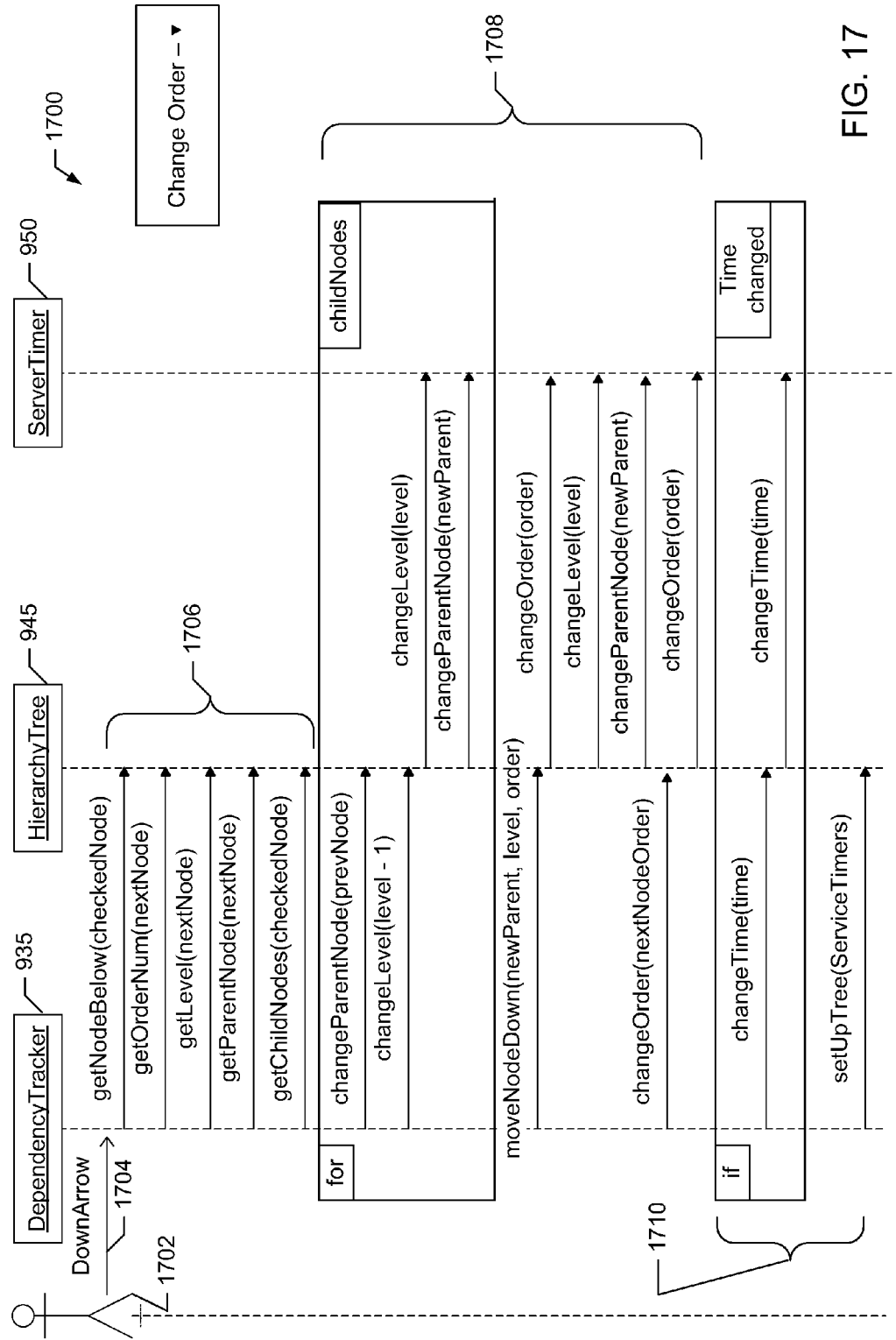
FIG. 17 illustrates a message sequence diagram representative of an example move order down procedure performed by the example object oriented implementation of FIGS. 9A-9B.

An example message sequence diagram 1700 to move down a selected hierarchical dependency tree node's invocation order via the example object oriented implementation 900 of the example dependency configuration unit 210 is illustrated in FIG. 17. In the illustrated example of FIG. 17, an authenticated user 1702 uses the example GUI 330 of the example dependency configuration unit 210 to select one or more nodes each having an invocation order to be moved down (or, in other words, later) in the example hierarchical dependency tree. In the example message sequence diagram 1700, the authenticated user 1702 also uses the example GUI 330 to select a down-arrow icon to initiate a down arrow message 1704 indicating that the invocation order of each of the selected nodes is to be moved down in the example hierarchical dependency tree. Next, a set of messages 1706 is used to obtain the current parent-child dependency configuration associated with the selected nodes.

Then, using the obtained parent-child dependency configuration associated with each selected node, a set of messages 1708 moves the invocation order of each selected node down (later) in the example hierarchical dependency tree. Additionally, the set of messages 1708 updates any parent-child dependency relationships which are changed as a result of moving down the invocation order of a particular selected node. Next, a set of messages 1710 determines whether any changes to the parent-child dependency relationships require reassignment of a particular node to a new time block. The set of messages 1710 performs such time block reassignment, if necessary. The example message sequence diagram 1700 then ends.

Figure 18:
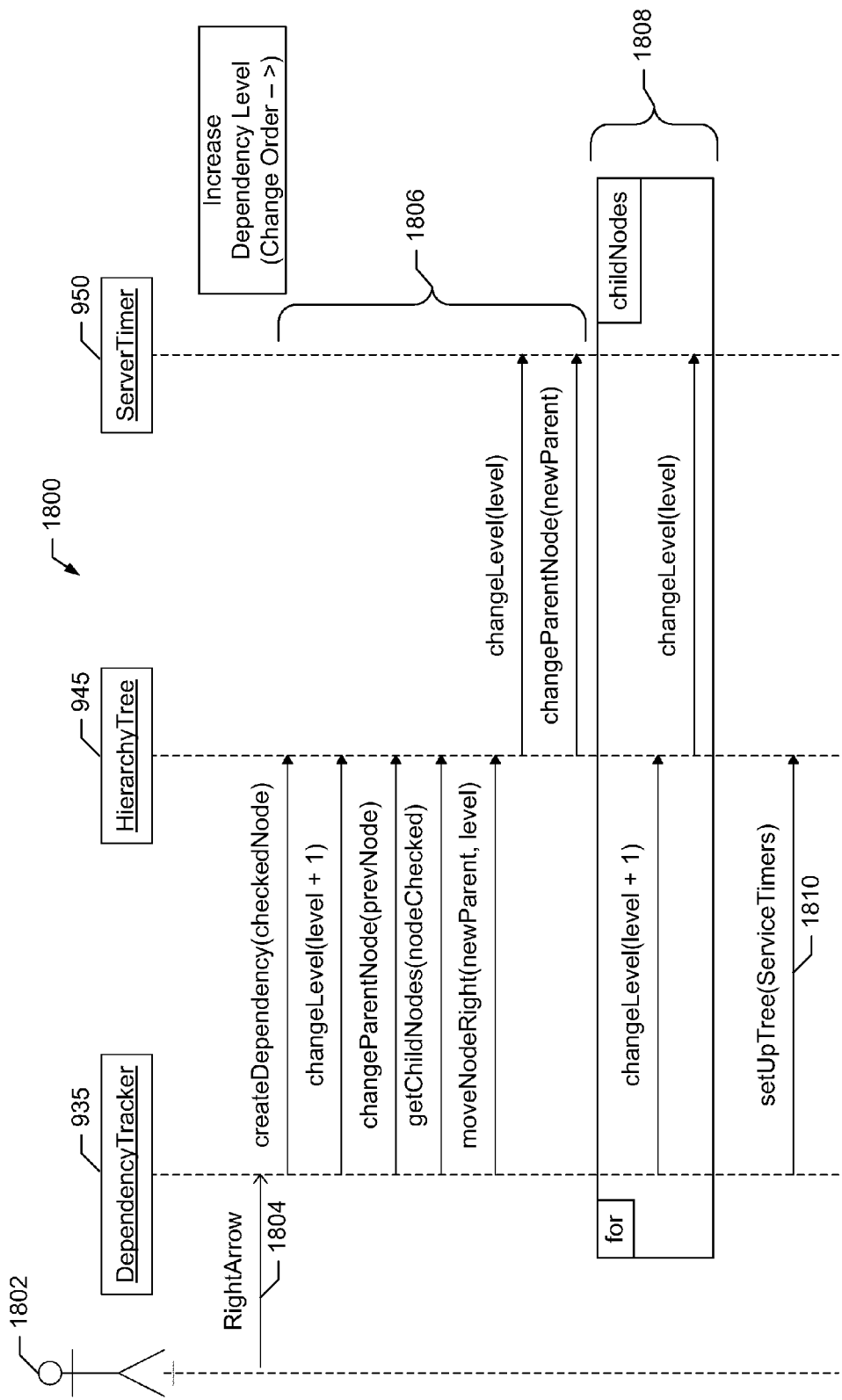
FIG. 18 illustrates a message sequence diagram representative of an example increase dependency level procedure performed by the example object oriented implementation of FIGS. 9A-9B.

An example message sequence diagram 1800 to increase a selected hierarchical dependency tree node's dependency level via the example object oriented implementation 900 of the example dependency configuration unit 210 is illustrated in FIG. 18. In the illustrated example of FIG. 18, an authenticated user 1802 uses the example GUI 330 of the example dependency configuration unit 210 to select one or more nodes each having a dependency level to be increased in the example hierarchical dependency tree. As such, each selected node is to be updated to be a child node of yet another node in the example hierarchical dependency tree. The authenticated user 1802 can also use the example GUI 330 to select one or more services assigned to a node and each having a dependency level to be increased in the example hierarchical dependency tree. In this latter case, the selected service(s) will be moved to an existing child node of the node previously containing the selected service(s), or a newly created child node if none exists. In the example message sequence diagram 1800, the authenticated user 1802 also uses the example GUI 330 to select a right-arrow icon to initiate a right arrow message 1804 indicating that the dependency level of each of the selected nodes/services is to be increased in the example hierarchical dependency tree.

Then, a set of messages 1806 increases the dependency level of each selected node in the example hierarchical dependency tree. Additionally, the set of messages 1806 associates each selected node with an appropriate new parent node in the example hierarchical dependency tree. Next, a set of messages 1808 increases the dependency level(s) of any child nodes associated with each selected node to reflect the child node(s) new dependency relationship(s) in the example hierarchical dependency tree. Then, a message 1810 performs system timer setup for the selected node(s) and associated child node(s). The example message sequence diagram 1800 then ends.

Figure 19:
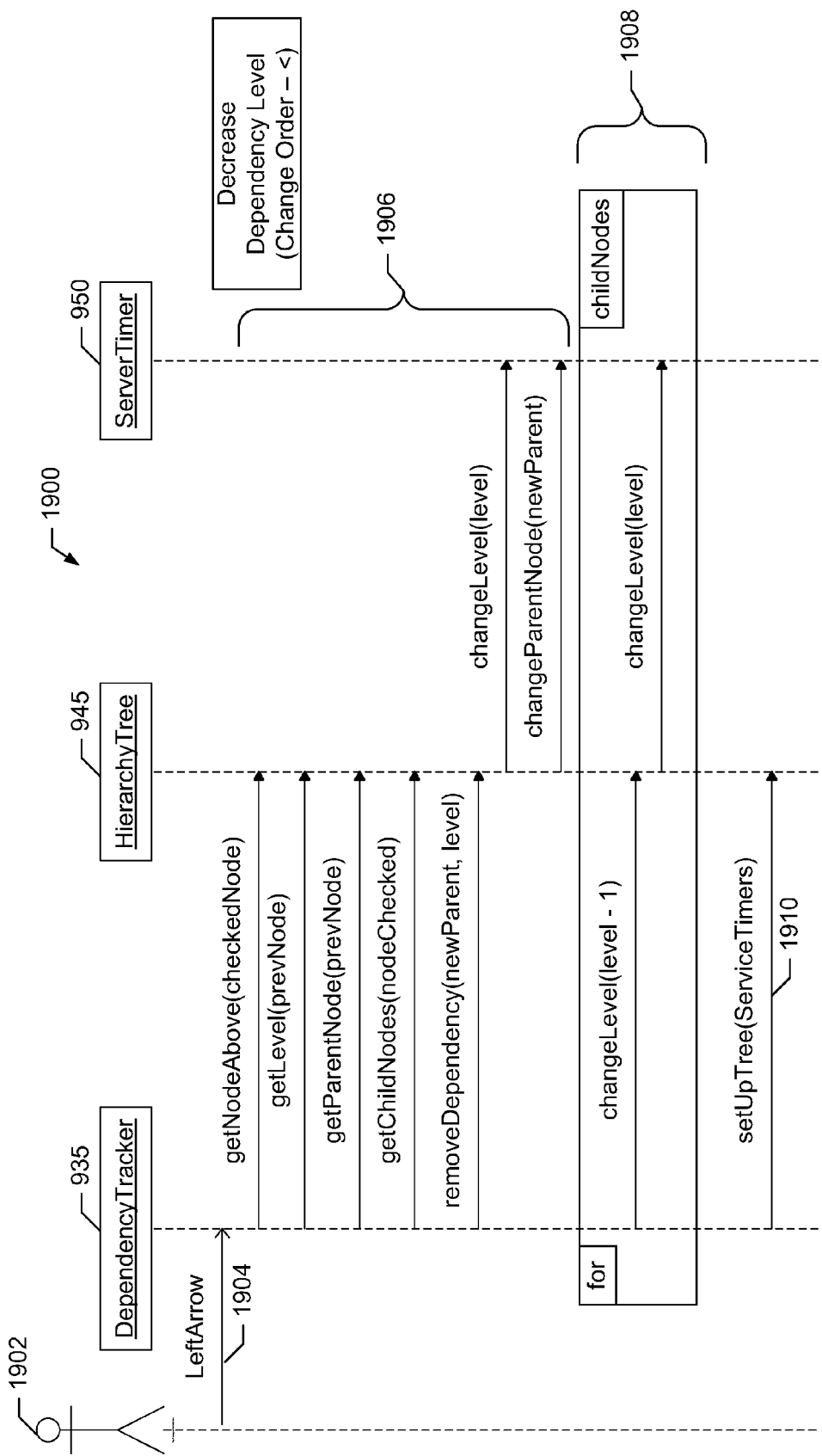
FIG. 19 illustrates a message sequence diagram representative of an example decrease dependency level procedure performed by the example object oriented implementation of FIGS. 9A-9B.

An example message sequence diagram 1900 to decrease a selected hierarchical dependency tree node's dependency level via the example object oriented implementation 900 of the example dependency configuration unit 210 is illustrated in FIG. 19. In the illustrated example of FIG. 19, an authenticated user 1902 uses the example GUI 330 of the example dependency configuration unit 210 to select one or more nodes each having a dependency level to be decreased in the example hierarchical dependency tree. As such, each selected node is to be updated to remove a dependency relationship in the example hierarchical dependency tree. In the example message sequence diagram 1900, the authenticated user 1902 also uses the example GUI 330 to select a left-arrow icon to initiate a left arrow message 1904 indicating that the dependency level of each of the selected nodes is to be decreased in the example hierarchical dependency tree.

Then, a set of messages 1906 decreases the dependency level of each selected node in the example hierarchical dependency tree. Additionally, the set of messages 1906 removes the dependency relationship between each selected node and its immediate parent node in the example hierarchical dependency tree. Next, a set of messages 1908 decreases the dependency level(s) of any child node(s) associated with each selected node to reflect the child node(s) new dependency relationship(s) in the example hierarchical dependency tree. Then, a message 1910 performs system timer setup for the selected node(s) and associated child node(s). The example message sequence diagram 1900 then ends.

Figure 20:
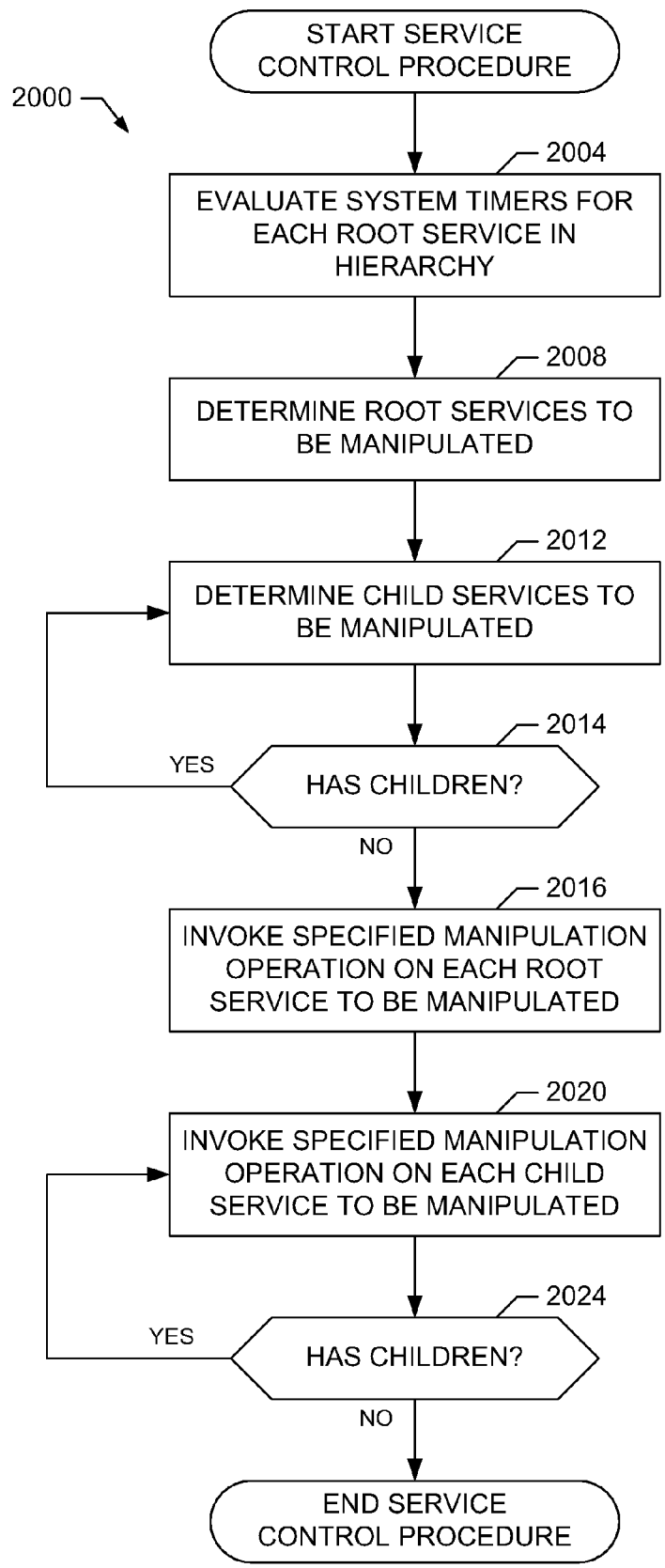
FIG. 20 illustrates a flowchart representative of example machine readable instructions to perform a service control procedure that may be executed to implement the example service control unit of FIGS. 2 and/or 4.

Example machine readable instructions 2000 to perform an example service control procedure that may be executed to implement the example service control unit 220 included in the example SMU 200 of FIG. 2 are represented by the flowchart shown in FIG. 20. The example machine readable instructions 2000 may be executed, for example, (1) when one or more service timers indicate (for example, by generating a signal, interrupt, etc.) the occurrence(s) of one or more specified time blocks to which one or more services (nodes) have been assigned, (2) according to some specified polling schedule, etc., or any combination thereof. In the illustrated example, services included in the example hierarchical dependency tree are assumed to have one-to-one correspondences with nodes of the hierarchical dependency tree. As such, the terms "service" and "node" are used interchangeably in the description of FIG. 20 unless otherwise noted. However, the example machine readable instructions 2000 illustrated in FIG. 20 may be readily adapted to support implementations in which multiple services may be associated with a single node in the hierarchical dependency tree.

Turning to FIG. 20, the example machine readable instructions 2000 begin execution at block 2004 at which the example service control unit 220 evaluates the system timers associated with each root service/node in the example hierarchical dependency tree maintained by the example dependency configuration unit 210. For example, at block 804 the example service timer evaluation unit 405 included in the example service control unit 220 may be used to evaluate the system timers associated with the root services/nodes to determine which system timer(s) indicate that a tracked time block has occurred.

Next, control proceeds to block 2008 at which the example service control unit 220 determines which root services/nodes are to be manipulated at the present time. For example, at block 2008 the example dependency evaluation unit 410 included in the example service control unit 220 may determine which time block has occurred based on the system timer evaluation performed at block 2004. The example dependency evaluation unit 410 then determines which root service(s)/node(s) are assigned to the current time block and, thus, for which service(s) manipulation(s) are to be performed.

Next, control proceeds to block 2012 at which the example service control unit 220 determines which child service(s)/node(s) are to be manipulated at the present time. For example, at block 2012 the example dependency evaluation unit 410 evaluates any dependency relationships specified for the root service(s)/node(s) identified at block 2008. The example dependency evaluation unit 410 then determines which child service(s)/node(s) have dependency relationships with the identified root service(s)/node(s) and, thus, for which service(s) manipulation(s) are to be performed. Then, at block 2014 the example service control unit 220 determines whether any child service(s)/node(s) are parents of associated grandchild service(s)/node(s) and, if so, control returns to block 2012 to determine any grandchild service(s) to be manipulated. Blocks 2012 and 2014 are iterated until the child service(s)/node(s) at a particular iteration are not parents of any associated grandchild service(s)/node(s).

Next, control proceeds to block 2016 at which the example service control unit 220 invokes one or more specified service manipulation operations to manipulate the operational state of each root service/node identified at block 2008. For example, at block 2016 the example dependency evaluation unit 410 causes the example service operation invocation unit

415 to invoke the service manipulation operation(s) specified for each of the identified root services/node. Additionally, at block 2016 the example service operation invocation unit 415 may condition invocation of the service manipulation operations on any invocation order specified for the root services (nodes) identified at block 2008.

Next, control proceeds to block 2020 at which the example service control unit 220 invokes one or more specified service manipulation operations to manipulate each child service/node identified at block 2012, but with invocation conditioned on the specified dependency relationship between the child service/node and its associated parent service/node. For example, at block 2020 the example dependency evaluation unit 410 waits for the service manipulation operation(s) invoked for each child's parent service/node for complete, thereby satisfying the specified dependency relationship. Then, when the specified dependency relationship associated with each child service/node is satisfied, the example dependency evaluation unit 410 causes the example service operation invocation unit 415 to invoke one or more service manipulation operations to manipulate the operational state of the child service/node. Additionally, at block 2020 the example service operation invocation unit 415 may condition invocation of the service manipulation operations associated with multiple child services/nodes on any invocation order specified for each child service/node identified at block 2012. Then, at block 2024 the example service control unit 220 determines whether any of the manipulated child service(s)/node(s) are parents of associated grandchild service(s)/node(s) to be manipulated and, if so, control returns to block 2020 to allow such grandchild service(s) to be manipulated. Blocks 2020 and 2014 are iterated until the child service(s)/node(s) at a particular iteration are not parents of any associated grandchild service(s)/node(s) to be manipulated. Then, after processing at blocks 2020 and 2024 completes, execution of the example machine readable instructions ends.

Figure 21:
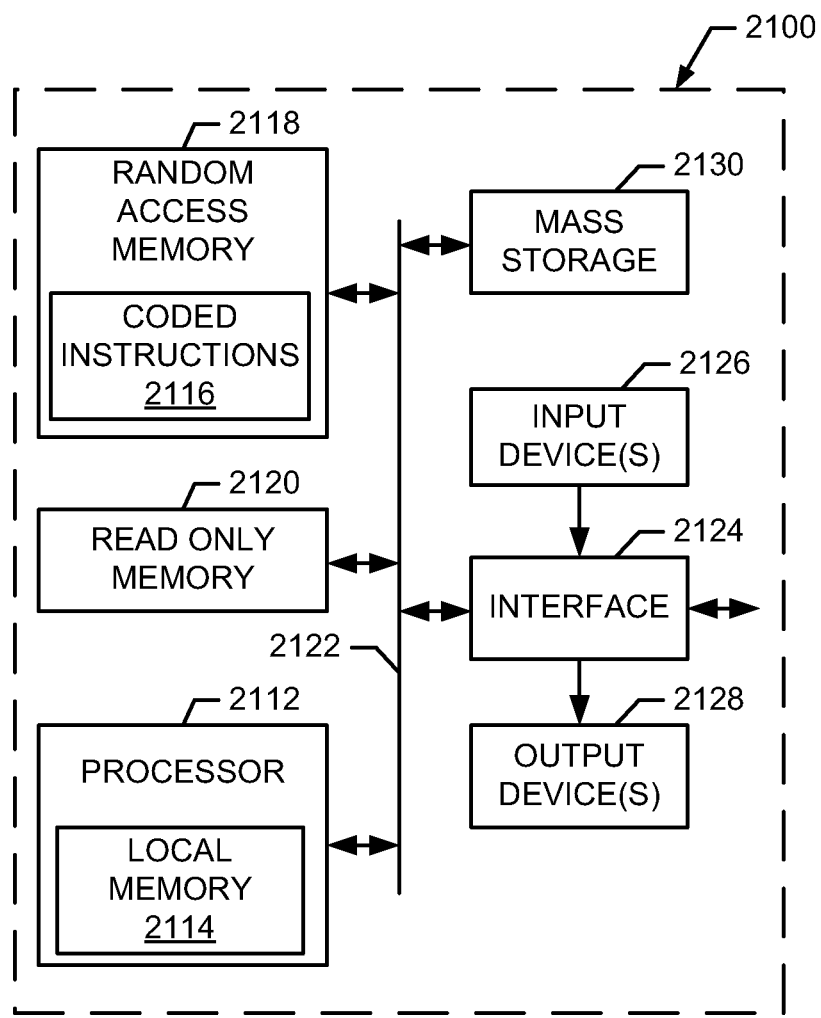
FIG. 21 illustrates a block diagram of an example processing system that may execute the example machine readable instructions of FIGS. 5-8 and/or 20 and/or implement the graphical user interface of FIG. 22 to implement the example service manipulation unit of FIG. 2.

FIG. 21 is a block diagram of an example computer 2100 capable of implementing the apparatus and methods disclosed herein. The computer 2100 can be, for example, a server, a personal computer, a personal digital assistant (PDA), an Internet appliance, a DVD player, a CD player, a digital video recorder, a personal video recorder, a set top box, or any other type of computing device.

The example system 2100 includes a processor 2112 such as a general purpose programmable processor. The processor 2112 includes a local memory 2114, and executes coded instructions 2116 present in the local memory 2114 and/or in another memory device. The processor 2112 may execute, among other things, the machine readable instructions represented in FIGS. 5-8 and 20, and/or the example GUI 2200 of FIG. 22. The processor 2112 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 2112 is in communication with a main memory including a volatile memory 2118 and a non-volatile memory 2120 via a bus 2122. The volatile memory 2118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2120 may be implemented by flash memory and/or any other desired type of memory device. Access to the main memory 2118, 2120 is typically controlled by a memory controller (not shown).

The computer 2100 also includes an interface circuit 2124. The interface circuit 2124 may be implemented by any type of interface standard, such as an Ethernet interface, a universal serial bus (USB), and/or a third generation input/output (3GIO) interface.

One or more input devices 2126 are connected to the interface circuit 2124. The input device(s) 2126 permit a user to enter data and commands into the processor 2112. The input device(s) can be implemented by, for example, a keyboard, a mouse, a touchscreen, a track-pad, a trackball, an isopoint and/or a voice recognition system.

One or more output devices 2128 are also connected to the interface circuit 2124. The output devices 2128 can be implemented, for example, by display devices (e.g., a liquid crystal display, a cathode ray tube display (CRT)), by a printer and/or by speakers. The interface circuit 2124, thus, typically includes a graphics driver card.

The interface circuit 2124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 2100 also includes one or more mass storage devices 2130 for storing software and data. Examples of such mass storage devices 2130 include floppy disk drives, hard drive disks, compact disk drives and digital versatile disk (DVD) drives. The mass storage device 2130 may be used to store the example hierarchical dependency tree maintained by the example dependency configuration unit 210. Alternatively, the volatile memory 2118 may be used to store the example hierarchical dependency tree maintained by the example dependency configuration unit 210.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for use in a distributed computing environment, the method comprising:
   generating, at a first computing device, a graphical user interface depicting a hierarchical tree structure comprising a set of nodes, each node representative of at least one service, the set of nodes interconnected to represent a set of dependency relationships, the graphical user interface further depicting a set of user-selectable input commands that, when selected, cause the hierarchical tree structure to be revised automatically in accordance with a user selection, the graphical user interface employing different visual representations to depict different types of operations capable of being performed to manipulate operational states of services represented in the hierarchical tree structure;
   obtaining, using the graphical user interface generated at the first computing device, a dependency relationship specified between a first service and a second service, the first service and the second service implementing at least portions of the distributed computing environment, at least one of the first service and the second service operating on a second computing device different from the first computing device, the dependency relationship maintained in the hierarchical tree structure; and
   conditioning invocation of a first operation to manipulate an operational state of the first service, the invocation of the first operation being conditioned on the dependency relationship specified between the first service and the second service, the invocation of the first operation also being conditioned to occur during a scheduled time interval specified at the first computing device.

2. The method as defined in claim 1 wherein the first service comprises a central management server operating on the second computing device to implement a business intelligence computing environment.

3. The method as defined in claim 1 wherein the first operation comprises at least one of a stop operation, a start operation, a disable operation and an enable operation.

4. The method as defined in claim 1 wherein the first service operates on the second computing device and the second service operates on a third computing device different from the first computing device.

5. The method as defined in claim 1 wherein the dependency relationship comprises a dependency requirement that the second operation to manipulate the operational state of the second service is to complete before the invocation of the first operation to manipulate the operational state of the first service.

6. The method as defined in claim 5 wherein the second operation comprises a disable operation and the first operation comprises a stop operation, and the dependency relationship causes the second service to be disabled before the first service is stopped.

7. The method as defined in claim 5 wherein the second operation comprises a start operation and the first operation comprises an enable operation, and the dependency relationship causes the second service to be started before the first service is enabled.

8. The method as defined in claim 1 wherein the dependency relationship comprises a dependency requirement that the second operation to manipulate the operational state of the second service is to be invoked and completed during the scheduled time interval before the invocation of the first specified operation during the scheduled time interval to manipulate the operational state of the first service.

9. The method as defined in claim 1 wherein the dependency relationship is a first dependency relationship, and further comprising:
   specifying, at the first computing device, a second dependency relationship between a third service and the second service;
   specifying an invocation order between the first service and the third service; and
   conditioning invocation of a third operation to manipulate an operational state of the third service, the invocation of the third operation being conditioned on: the second dependency relationship specified between the third service and the second service, and the invocation order specified between the first service and the third service.

10. The method as defined in claim 1 further comprising: depicting the hierarchical tree structure graphically using a tree graph comprising root nodes representing a first set of services having no dependencies on other services, and child nodes representing a second set of services, each service in the second set depending from at least one service in the first set or in the second set.

11. The method as defined in claim 1 wherein the specified operation is a first specified operation, the scheduled time interval is a first scheduled time interval, and further comprising conditioning invocation of a second specified operation to manipulate an operational state of the second service to occur during a second scheduled time interval specified at the first computing device, the second scheduled time interval to occur before the first scheduled time interval.

12. A tangible machine readable storage medium comprising machine readable instructions which, when executed, cause a machine to perform a method comprising:
   generating, at a computing device, a graphical user interface depicting a hierarchical tree structure comprising a set of nodes, each node representative of at least one service, the set of nodes interconnected to represent a set of dependency relationships, the graphical user interface further depicting a set of user-selectable input commands that, when selected, cause the hierarchical tree structure to be revised automatically in accordance with a user selection, the graphical user interface employing different visual representations to depict different types of operations capable of being performed to manipulate operational states of services represented in the hierarchical tree structure depicted in the graphical user interface;

obtaining, using the graphical user interface generated at the computing device, a first dependency relationship specified between a first service and a second service, the first service and the second service implementing at least portions of a computing environment;

obtaining, using the graphical user interface generated at the computing device, a second dependency relationship specified between a third service and the second service, the first and second dependency relationships maintained in the hierarchical tree structure;

using different relative positions in the graphical user interface depiction of the hierarchical tree structure to specify an order in which operations are to be invoked to manipulate different services having no dependency relationships therebetween, the relative positions in the graphical user interface depiction of the hierarchical tree structure to specify an order of invocation between a first specified operation to manipulate an operational state of the first service and a third specified operation to manipulate an operational state of the third service, the first service and the third service having the respective first and second dependency relationships with the second service, but the first service and the third service having no dependency relationship therebetween; and condition invocation of the first specified operation on the first dependency relationship specified between the first service and the second service, completion of a second specified operation invoked to manipulate the second service, and the order of invocation specified between the first specified operation to manipulate the operational state of the first service and the third specified operation to manipulate the operational state of the third service.

13. The storage medium as defined in claim 12 wherein the machine readable instructions, when executed, further cause the machine to condition invocation of the first specified operation on the dependency relationship specified between the first service and the second service and on occurrence of a specified time interval.

14. The storage medium as defined in claim 12 wherein the machine readable instructions, when executed, further cause the machine to:

condition invocation of the third specified operation on: the second dependency relationship specified between the third service and the second service and the invocation order specified between the first specified operation to manipulate the operational state of the first service and the third specified operation to manipulate the operational state of the third service.

15. An apparatus to manipulate services implementing a business intelligence computing environment, the apparatus comprising:

a memory to store machine readable instructions;

a dependency configuration processor responsive to the instructions to perform actions comprising generating a graphical user interface depicting a hierarchical tree structure to specify dependency relationships between services, the services implementing the business intelligence computing environment, the hierarchical tree structure comprising a set of nodes, each node representative of at least one service, the set of nodes interconnected to represent the dependency relationships, the graphical user interface further depicting a set of user-selectable input commands that, when selected, cause the hierarchical tree structure to be revised automatically in accordance with a user selection, the graphical user interface employing different visual representations to depict different types of operations capable of being performed to manipulate operational states of services represented in the hierarchical tree structure depicted in the graphical user interface, a first dependency relationship of the dependency relationships comprising a relationship between a respective first service and a respective second service, the first dependency relationship comprising:

a first requirement that a first specified operation to manipulate an operational state of the first service is to complete before invocation of a second specified operation to manipulate an operational state of the second service; and a second requirement that the first specified operation is to be invoked during a scheduled time interval tracked by a timer to be assigned to the first specified operation; and a service control processor responsive to the instructions to perform actions comprising invoking operations to manipulate operational states of the services according to the dependency relationships specified by the graphical user interface generated by the dependency configuration processor.

16. The apparatus as defined in claim 15 wherein the first dependency relationship further comprises a third requirement indicating an order of invocation for the second specified operation, the order of invocation indicating whether the second specified operation is to be invoked before or after a third specified operation to manipulate an operational state of a third service, the third service also having a specified dependency relationship with the first service.

17. The apparatus as defined in claim 15 wherein the dependency configuration processor is to further specify a start time of the scheduled time interval at which the first specified operation is to be invoked, and the service control processor is to: invoke the first specified operation at the specified start time and invoke the second specified operation after completion of the first specified operation.

18. The apparatus as defined in claim 15 wherein the scheduled time interval is a first scheduled time interval, and the dependency relationship further comprises a third requirement that the respective second specified operation is to be invoked during a second scheduled time interval after the first scheduled time interval.

19. The apparatus as defined in claim 15 wherein the dependency configuration processor and the service control processor are implemented by a same hardware processor.

20. A system comprising:

a memory to store machine readable instructions; and a service manipulation unit implemented by at least one of a plurality of computing devices, the plurality of computing devices to implement a plurality of servers included in the business intelligence computing environment, the plurality of servers implemented by a plurality of services executing on the plurality of computing devices, the service manipulation unit to invoke operations to effect operational states of at least some of the plurality of services without user intervention, the service manipulation unit comprising:

a dependency configuration processor responsive to the instructions to perform actions comprising:

generating a graphical user interface depicting a hierarchical tree structure comprising a set of nodes, each node representative of at least one service, the set of nodes interconnected to represent a set of dependency relationships, the graphical user interface further depicting a set of user-selectable input commands that, when selected, cause the hierarchical tree structure to be revised automatically in accordance with a user selection, the graphical user interface employing different visual representations to depict different types of operations capable of being performed to manipulate operational states of services represented in the hierarchical tree structure depicted in the graphical user interface;

obtaining, using the graphical user interface, a dependency relationship between a respective first service and a respective second service, the dependency relationship comprising a first requirement that a first specified operation to effect an operational state of the first service is to complete during a specified time interval before invocation of a second specified operation to effect an operational state of the second service; and obtaining, using the graphical user interface, an order of invocation for specified operations to effect operational states of services in a group of child services that have no dependency relationships between each other, but that have dependency relationships with a same parent service, the dependency configuration processor to use different relative positions in the graphical user interface depiction of the hierarchical tree structure to specify the order in which the specified operations are to be invoked to manipulate the group of child services having no dependency relationships between each other; and a service control processor responsive to the instructions to perform actions comprising invoking operations to effect operational states of the plurality of services according to the dependency relationships and the order of invocation specified by the dependency configuration processor, the service control processor to invoke at least one of the operations for at least one of the plurality of services based on a specified start time without conditioning invocation on completion of any operation to effect any operational state of any other service in the plurality of services.

21. The system as defined in claim 20 further comprising a plurality of service manipulation units, each service manipulation unit implemented on a respective server in the plurality of servers and responsive to an authenticated administrator of the plurality of service manipulation units.

22. The system as defined in claim 20 wherein the dependency configuration processor and the service control processor are implemented by a same hardware processor.

* * * * *